United States Patent [19]

Breternitz, Jr.

[11] Patent Number: 5,634,025
[45] Date of Patent: May 27, 1997

[54] METHOD AND SYSTEM FOR EFFICIENTLY FETCHING VARIABLE-WIDTH INSTRUCTIONS IN A DATA PROCESSING SYSTEM HAVING MULTIPLE PREFETCH UNITS

[75] Inventor: Mauricio Breternitz, Jr., Austin, Tex.

[73] Assignee: International Business Machines Corporation, Armonk, N.Y.

[21] Appl. No.: 228,973

[22] Filed: Apr. 18, 1994

Related U.S. Application Data

[63] Continuation-in-part of Ser. No. 164,497, Dec. 9, 1993, abandoned.

[51] Int. Cl.[6] ............................................. G06F 9/00
[52] U.S. Cl. ................................................. 395/383
[58] Field of Search ..................... 364/DIG. 1 MS File, 364/DIG. 2 MS File; 395/484, 496, 375, 800, 427, 401, 405, 376, 380, 381, 382, 383, 390

[56] References Cited

U.S. PATENT DOCUMENTS

| | | | |
|---|---|---|---|
| 4,777,587 | 10/1988 | Case et al. | 395/375 |
| 4,873,629 | 10/1989 | Harris et al. | 395/375 |
| 4,951,246 | 8/1990 | Fromm et al. | 395/496 |
| 5,109,348 | 4/1992 | Pfeiffer et al. | 395/164 |
| 5,129,060 | 7/1992 | Pfeiffer et al. | 395/166 |

OTHER PUBLICATIONS

Karplus et al. "Getting high performance with slow memory" IEEE Computer Society Order No. 692 (1986) pp. 248–253.
Karplus et al. "A Complier–Driven Supercomputer" Applied Mathematics and Computation (1986) pp. 95–103.

*Primary Examiner*—Robert B. Harrell
*Attorney, Agent, or Firm*—Andrew J. Dillon

[57] ABSTRACT

In a data processing system, a plurality of primary and secondary prefetch elements are provided for prefetching a primary portion and a secondary portion of instruction words from a group of primary and secondary memory arrays coupled to each primary and secondary prefetch element, respectively. In response to a selected primary or secondary prefetch element receiving a prefetch token, the selected primary or secondary prefetch element sequentially recalls instruction words from the group of primary or secondary memory arrays, respectively. In response to a forthcoming conditional branch instruction, a plurality of prefetch elements may initiate instruction fetching so that the proper instruction may be executed during the cycle time immediately following the conditional branch instruction. The primary prefetch elements are utilized to fetch a primary portion of a variable-width instruction word, and the secondary prefetch elements, which are synchronized with the primary prefetch elements, are utilized to fetch a secondary portion of the variable-width instruction word. Program memory space is conserved by fetching the secondary portion of an instruction word only when required.

16 Claims, 13 Drawing Sheets

METHOD AND SYSTEM FOR EFFICIENTLY FETCHING VARIABLE-WIDTH INSTRUCTIONS IN A DATA PROCESSING SYSTEM HAVING MULTIPLE PREFETCH UNITS

CROSS-REFERENCE TO RELATED APPLICATION

This present application is a continuation-in-part of U.S. patent application Ser. No. 08/164,497, filed Dec. 9, 1993, for "Method And System For Efficient Instruction Execution In A Data Processing System Having Multiple Prefetch Units", now abandoned.

BACKGROUND OF THE INVENTION

1. Technical Field

The present invention relates in general to an improved data processing system, and in particular to a method and system for efficiently fetching variable-width instructions in a data processing system having multiple instruction prefetch elements. Still more particularly, the present invention relates to a method and system for reducing the program memory space required to implement a data processing system having a number of prefetch elements for fetching variable-width instructions for a central processing unit which may execute one instruction per cycle time, during the execution of multiway branch instructions.

2. Description of the Related Art

Recently, a new data processing system architecture, called of ring of prefetch elements (ROPE), has been disclosed in an article entitled "Getting High Performance With Slow Memory," by Kevin Karplus and Alexandru Nicolau, published in COMPCON, May, 1986, at pages 248–253. The purpose of the architecture is to provide a data processing system capable of sustaining an instruction execution rate of one instruction per cycle time, even during the execution of multiway branch instructions. Such a data processing system may be useful for processing real-time video and multimedia presentations. This ROPE architecture is illustrated as prior art in FIG. 1.

As illustrated, ROPE architecture 20 includes "M" number of prefetch elements 22, 24, 26, and 28, for fetching instructions from an associated memory bank. The determination of the number of prefetch elements (i.e., the number "M") required for a particular application of the ROPE architecture is discussed below in greater detail. Memory banks 30–36 are each associated with one prefetch element 22–28, respectively, and are utilized for storing instructions only. Separate data memory banks may be provided for storing program variables or other temporary or variable data. An advantage of this ROPE architecture is that memory banks 30–36 may be implemented by memory devices which require a relatively long period of time to fetch data when compared to the cycle time of the CPU which receives the instructions. As utilized herein, "cycle time" means the minimum duration between two successive instruction requests by the CPU.

Once prefetch elements 22–28 fetch instructions from memory banks 30–36, such instructions are placed on instruction bus 38 at an appropriate time determined by logic circuits within prefetch elements 22–28 and control signals on control bus 40 and instruction bus 38. Instruction bus 38 is coupled to data path 42, which is part of CPU 44. Control bus 40 receives control information 48, which may include condition codes and the instruction pointer, from CPU 44.

Instructions stored within memory banks 30–36 may be very large (i.e., long). In some implementations, the instruction word may be 512 bits wide, and include a plurality of fields. At least one of such fields contains an instruction to be executed by CPU 44. CPU 44 may also be able to execute instructions represented by instruction words that comprise bits in several fields. Other fields in the instruction word may contain instructions addressed to one of prefetch elements 22–28. Such instructions may command the prefetch element to initiate a prefetch from an associated memory bank or command the prefetch element to place an instruction on instruction bus 38 after execution of a multiway conditional branch.

An advantage to utilizing an architecture that supports a very long instruction word (i.e., a VLIW architecture) is the ability to provide fine-grain parallelism between parallel operations being executed in software. However, VLIW architecture also has disadvantages. One disadvantage of the VLIW architecture is low efficiency memory utilization which may result when fields in the very long instruction word are not utilized.

In a typical implementation the VLIW architecture, each location in program memory must be configured to store a long instruction word comprised of bits grouped into several fields. However, not every field of every long instruction word will contain instruction information. As the number of program memory locations having fields without instruction information increases, the efficiency of program memory utilization decreases.

In operation, ROPE architecture 20 is capable of supplying data path 42 with one instruction per cycle time, even after the execution of a multiway conditional branch. One instruction per cycle time is placed on instruction bus 38 by a selected prefetch element. Prefetch elements 22–28 are selected to place an instruction on instruction bus 38 by the reception of an "activate" token. Such an activate token is a particular message or bit pattern that signifies permission to place an instruction on instruction bus 38. A prefetch element is not permitted to place an instruction on instruction bus 38 unless that prefetch element holds the activate token. Since only one prefetch element holds the activate token at a given time, only one prefetch element is permitted to place instruction data on instruction bus 38 at any given time.

In a "non-branch" mode of operation, wherein a branch instruction is not currently anticipated within a specified number of cycle times, the activate token is passed from one prefetch element to a next adjacent prefetch element, via control bus 40, continuing in this manner until all of the M prefetch elements have received the activate token, and all prefetch elements have been allowed one cycle time to place a single instruction on instruction bus 38. Once the last (i.e., the Mth) prefetch element has placed on instruction bus 38, the process continues around the ring of prefetch elements, where the first prefetch element is again permitted to place an instruction on instruction bus 38, without allowing a cycle time to pass without placing an instruction on instruction bus 38.

For example, if prefetch element 22 holds the activate token, prefetch element 22 places a single instruction from memory bank 30 onto instruction bus 38, which may then be received by data path 42. Thereafter, the activate token is passed from prefetch element 22 to prefetch element 24, and prefetch element 24 is allowed to place an instruction from memory bank 32 on instruction bus 38 during the next cycle time. Once prefetch element 28 has received the activate token and placed an instruction from memory bank 36 on instruction bus 38, the activate token may be passed around the ring to prefetch element 22. In such a manner, the process of executing non-branch instructions may continue indefinitely.

Because relatively slow memory devices may be utilized to implement memory banks 30–36, prefetch elements 22–28 typically begin the process of fetching an instruction from an associated memory bank several cycle times before that prefetch element is scheduled to receive the activate token and place the fetched instruction on instruction bus 38. Therefore, a "prefetch token" is utilized to initiate a memory access by a selected prefetch element holding such a prefetch token. Prefetch tokens are passed to prefetch elements several cycle times before a prefetch element may receive the activate token. Thus, in non-branch instruction execution, the prefetch element holding the prefetch token precedes the prefetch element holding the activate token, in the ring of prefetch elements, by a number of prefetch elements at least equal to the number of cycle times required to fetch an instruction from memory banks 30–36.

For example, if prefetch element 28 holds the activate token, and is currently placing an instruction on instruction bus 38, the prefetch token is typically located several prefetch elements ahead of prefetch element 28 in the ring of prefetch elements. Thus, a prefetch element, such as prefetch element 26, holding the prefetch token may begin fetching an instruction from memory bank 34 three cycle times before the time the activate token may be received by prefetch element 26. The number of prefetch elements by which the prefetch token precedes the activate token depends upon the speed of memory utilized in memory banks 30–36 and the cycle time of the CPU. Typically, the prefetch token precedes the activate token by a number of prefetch elements equivalent to the number of cycle times required to fetch an instruction from a memory bank.

In a "branch" mode of operation, multiple prefetch elements, within the group of M prefetch elements 22–28, must begin to fetch an instruction in anticipation of placing a fetched instruction on instruction bus 38 during the cycle time immediately after the CPU determines which branch in the program will be executed. For example, if a three-way branch is forthcoming, three prefetch elements will receive three different prefetch tokens, each of which instructs a prefetch element to begin fetching an instruction from its associated memory bank. Once the CPU determines which one of the three branches to execute, one of the three prefetch elements will receive the activate token, and that prefetch element will place the next instruction on instruction bus 38, thereby enabling the CPU to continue executing instructions in the selected branch without waiting for instructions to be fetched from memory. The two prefetch units that were not activated are then made available to receive new prefetch instructions.

The number of prefetch elements required to implement the ROPE architecture depends upon the number of branches that may be selected during a conditional branch instruction and the number of cycle times required to fetch an instruction from a memory bank. If the data processing system CPU supports B-way conditional branching and the memory access requires C-cycles to fetch an instruction from a memory bank, then at least B*C prefetch elements are required to be able to prefetch instructions necessary to execute one B-way branch while maintaining an execution rate of one instruction per cycle time. For example, if the CPU supports three-way branching (B=3), and the memory requires four cycle times to fetch an instruction (C=4), then the number of prefetch elements required is at least 3*4, or 12.

Referring now to FIG. 2, there is depicted a prefetch schedule for performing a series of operations and branch instructions in a data processing system utilizing a plurality of prefetch elements as illustrated in the architecture of FIG. 1. In this figure, a sequence of nine cycle times, cycles A–I, are depicted vertically. During such cycle times, operations 50–72 and branch instructions 74 and 76 may be executed within CPU 44 (see FIG. 1), depending upon which branch is taken at branch instructions 74 and 76. In this example, operations 50–72 are able to complete execution within one cycle time.

Branch instruction 74 illustrates a multiway branch instruction, which, in this example, is a three-way branch instruction. Therefore, after cycle E, the program may execute operation 58, or operation 62, or operation 66, depending upon the outcome of tests performed at branch instruction 74. Multiway branches are made possible by CPUs which may execute a set of prespecified tests during a single cycle time. For example, branch instruction 74 may determine whether the result of operation 56 is less than zero, equal to zero or greater than zero, and then branch accordingly. Thus, operation 58 may be executed if the result of operation 56 is less than zero, or operation 62 may be executed if the result of operation 56 is equal to zero, or operation 66 may be executed if the result of operation 56 is greater than zero.

During instruction fetches 80–98, prefetch elements 22–28 (see FIG. 1) provide address signals to associated memory banks 30–36, respectively, and receive instruction words during subsequent cycle times. If the speed of memory banks 30–36 is such that four cycle times are required to fetch an instruction, then an instruction prefetch operation, which is conducted by prefetch elements 22–28, must be initiated four cycle times before the instruction is to be placed on instruction bus 38. Therefore, as illustrated in FIG. 2, instruction fetches 80–98 are initiated four cycle times before they are placed on instruction bus 38. As illustrated in cycle B, three instruction fetches 82–86 are initiated in anticipation of branch instruction 74, which is a three-way branch instruction.

It may also be seen in FIG. 2 that several instruction fetches may be in various stages of completion during any given cycle time. For example, during cycle E, instruction fetch 80 is complete, instruction fetches 82–94 are in process, and instruction fetches 96 and 98 have just been initiated. Thus, during cycle E, ten instruction fetches, which are conducted utilizing ten prefetch elements, are in various stages of operation. Those persons skilled in the art will recognize that additional instruction prefetches, which are not illustrated, may be performed during cycle E for operations 60, 64, 70, and 72. Additionally, instruction fetches for operations 50–56 are not shown in FIG. 2.

Thus, a person of ordinary skill in the art should appreciate that in order to sustain consecutive B-way branch instructions at a rate of one B-way branch per cycle time in a data processing system utilizing program memory that requires C-cycles to fetch an instruction, the number of prefetch elements required approaches $B^{C+1}$ prefetch elements. Even for a data processing system that permits three-way branch instructions and utilizes memory that requires four cycles to fetch an instruction, approximately 240 prefetch elements would be required.

Turning now to FIGS. 3, 4, and 5, there are depicted three data processing architectures known in the prior art. As illustrated in these figures, a data processing system may be modeled as a union of control path and data path. The control path may be modeled as a finite state machine which generates control signals for the data path and reacts to status signals from the data path. Different classes of data processing system architectures may be differentiated by the modeling of the different types of control path structures.

FIG. 3 illustrates a high-level state machine model of a single instruction path/single data path (SISD) data processing system, which is widely utilized in many conventional data processing systems. The basic Moore machine is found in the control path of the model of a classical microprogrammed SISD uniprocessor shown in FIG. 3. In this model, program memory output function 110 depends only on the state variable supplied by program counter 112. Thus, for a given value of program counter 112, a given instruction will execute within various functional units within data path 114.

Next state function 116 is a function of condition codes 118 from data path 114, control path state 120 from program counter 112, and external inputs (not shown). Data path 114 may be comprised of a plurality of functional units which perform a wide variety of operations on multiple data types. Data path 114 is essentially capable of performing all of the operations of a RISC type processor, including loads, stores, and branches. Data path 114 may be able to execute one data operation and one control operation (branch) per cycle.

FIG. 4 depicts a high-level state machine model of a very long instruction word (VLIW) data processing system. The VLIW processor has multiple functional units within data paths 124–128, each of which are similar to data path 114 of the SISD processor of FIG. 3. The VLIW model control path portion contains a separate program memory output function 130–134 for each data path 124–128. Condition codes 135 from all data paths 124–128 serve as inputs to next state function 136. In an actual implementation, this implies that condition code and status information from each data path 124–128 feeds back into the instruction sequencer.

FIG. 5 illustrates a high-level state machine model of a variable instruction stream/multiple data stream (XIMD) data processor. The XIMD architecture is an extension to the VLIW architecture (see FIG. 4) that allows for a variable number of instruction streams. The variable number and variable-width of the instruction streams and the low synchronization overhead offered by the XIMD architecture make it feasible to support both fine- and medium-grained machine parallelism. The VLIW architecture provides a sequencer for each data path and adds a distribution network for condition code bits and software-set synchronization bits. The condition codes bits result from operations performed on run-time data; software-set synchronization bits are provided directly from the instructions. Each instruction has a field for the sequencer and a field for the data path. The sequencer determines the next instruction address as a function of the sequencer field, the current instruction address, and the software-set synchronization bits and condition code bits of all functional units. These augmentations allow greater capability and flexibility in managing the flow of control than are available for a VLIW.

To synchronize instruction streams in multiple data paths in the XIMD architecture, three forms of synchronization can be effectively implemented: implicit, explicit, and barrier synchronization. Implicit synchronization is possible because the common clock advances each instruction stream at the same rate. As long as instruction streams are kept in lockstep on cache misses and exceptions, the relative delay between operations in different instruction streams remains fixed. The scheduler can implicitly synchronize two dependent operations by creating and maintaining the necessary relative delay.

Explicit synchronization can be used to delay one instruction stream until it receives a signal from another using the sequencer field of an instruction in each instruction stream, the condition code bits, or by communicating through the global register file.

Barrier synchronization is a special case of explicit synchronization. Barrier synchronization is implemented on the XIMD by having each functional unit set its software-set synchronization bit reaches the barrier. The functional unit waits by repeatedly executing a conditional branch instruction that jumps to itself until all software-set synchronization bits are set. The synchronization overhead for explicit synchronization on the XIMD is on the order of a few cycle times, depending on the branch delay and the latency of the condition code and software-set synchronization bit distribution network. A typical multiple instruction stream/ multiple data stream machine uses explicit synchronization in the form of semaphores, communication through memory, or operating system calls to synchronize processes on different processors. Synchronization by these techniques result in overhead that ranges from ten to hundreds of cycle times, making the granularity of parallelism that can be effectively exploited rather coarse. The XIMD's low synchronization overhead makes the exploitation of fine-grained parallelism and the coordination of instruction streams on a cycle-by-cycle basis feasible.

When compared to the VLIW processor of FIG. 4, program memory output functions 142–146, and data paths 148–152, are unchanged. The remaining portion of the control path, program counter 154 and next state function 156, have been duplicated for each data path 148–152. This results in separate program counters 154, 158, and 162, for each data path 148–152. Also, separate next state functions 156, 160, and 166, represent separate address generation and sequencing hardware for each data path 148–152. Thus, in the XIMD model, next state function 156, 160, and 166 is a function of the data path state of each data path 148–152 and each control path state from program counters 154, 158, and 162.

Therefore, the problem remaining in the prior art is to provide a data processing system that has performance capabilities substantially similar to a data processing system utilizing ROPE architecture which utilizes substantially fewer prefetch elements, and utilizes program memory more efficiently by reducing the amount of program memory space that is not utilized to store instruction information.

SUMMARY OF THE INVENTION

It is one objective of the present invention to provide an improved data processing system.

It is another objective of the present invention to provide a method and system for efficiently fetching variable-width instructions in a data processing system having multiple instruction prefetch elements.

It is yet another objective of the present invention to provide a method and system for reducing the program memory space required to implement a data processing system having multiple prefetch elements for fetching variable-width instructions for a central processing unit which may execute one instruction per cycle time, even during the execution of multiway branch instructions.

It is yet another objective of the present invention to provide a data processing system architecture having multiple prefetch elements that is less expensive to manufacture, that comprises fewer components, that utilizes program memory more efficiently than prior art architectures having multiple prefetch elements, and that provides substantially similar performance to prior art architectures having multiple prefetch elements.

The foregoing objects are achieved as is now described. In a data processing system, a plurality of primary and secondary prefetch elements are provided for prefetching a primary portion and a secondary portion of instruction words from a group of primary and secondary memory arrays coupled to each primary and secondary prefetch element, respectively. In response to a selected primary or secondary prefetch element receiving a prefetch token, the selected primary or secondary prefetch element sequentially recalls instruction words from the group of primary or secondary memory arrays, respectively. In response to a forthcoming conditional branch instruction, a plurality of prefetch elements may initiate instruction fetching so that the proper instruction may be executed during the cycle time immediately following the conditional branch instruction. The primary prefetch elements are utilized to fetch a primary portion of a variable-width instruction word, and the secondary prefetch elements, which are synchronized with the primary prefetch elements, are utilized to fetch a secondary portion of the variable-width instruction word. Program memory space is conserved by fetching the secondary portion of an instruction word only when required.

The above, as well as additional objects, features, and advantages of the present invention, will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 6:
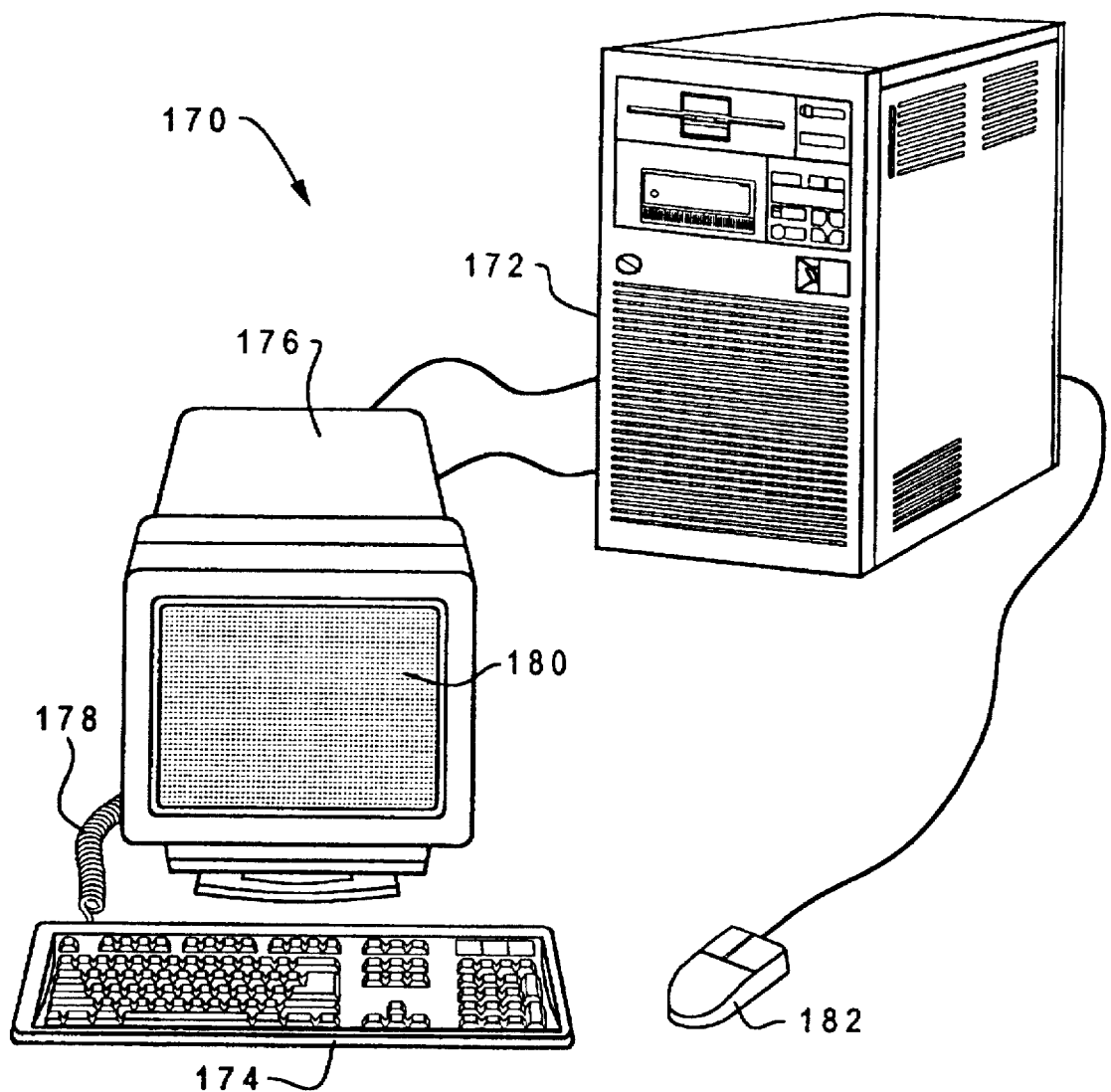
FIG. 6 depicts a data processing system which may be utilized to implement a preferred embodiment of the present invention.

With reference now to the figures and in particular with reference to FIG. 6, there is depicted a data processing system 170 which includes processor 172, keyboard 174, and display 176. Keyboard 174 is coupled to processor 172 via display 178. Display 176 includes display screen 180, which may be implemented utilizing a cathoray tube (CRT), a liquid crystal display (LCD), an electroluminescent panel, or the like. Data processing system 170 also includes pointing device 182 which may be implemented utilizing a track ball, joystick, touch sensitive tablet or screen, or as illustrated in FIG. 6, a mouse. Pointing device 182 may be utilized to move a pointer or cursor on display screen 180. Those persons skilled in the art of data processing system design will recognize that display 176, keyboard 174, and pointing device 182 may each be implemented utilizing any one of several known off-the-shelf components.

Figure 7:
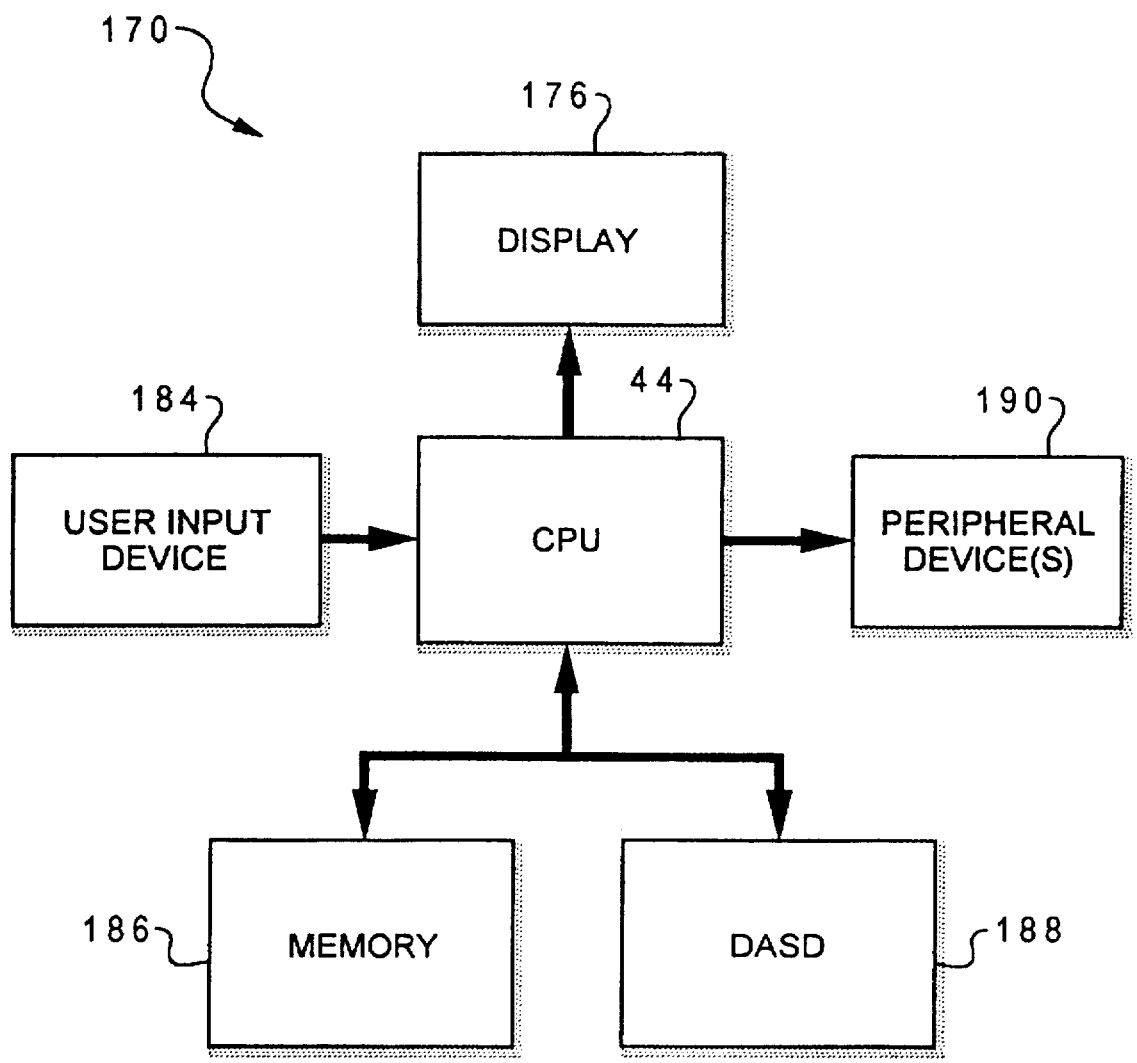
FIG. 7 is a more detailed high-level block diagram further illustrating the major components of the data processing system of FIG. 6.

FIG. 7 depicts a more detailed high-level block diagram further illustrating the major components of data processing system 170 of FIG. 6. Data processing system 170 is controlled primarily by instructions, in the form of software, executed within central processing unit (CPU) 44. CPU 44 is coupled to display 176, which is utilized to display text and graphics, and possibly animated graphics or video. CPU 44 is also coupled to user input device 184, which is utilized to receive input from a data processing system user. User input device 184 may include keyboard 174 and pointing device 182, as illustrated in FIG. 6. Memory 186 and direct access storage device (DASD) 188 may be utilized for storing application programs (i.e., software) and data sets.

According to an important aspect of the present invention, memory 186 is divided into memory banks for storing instructions, and separate data memory banks for storing program variables or other temporary or variable data. The organization of memory 186, and the method and system for coupling memory 186 to CPU 44, will be described below in greater detail with reference to FIGS. 8, 9, 12, and 13.

Peripheral devices 190 may also be included in data processing system 170. Such peripheral devices may include communications devices (i.e., modems or network adapters), or an audio output device for use during a multimedia presentation.

Figure 8:
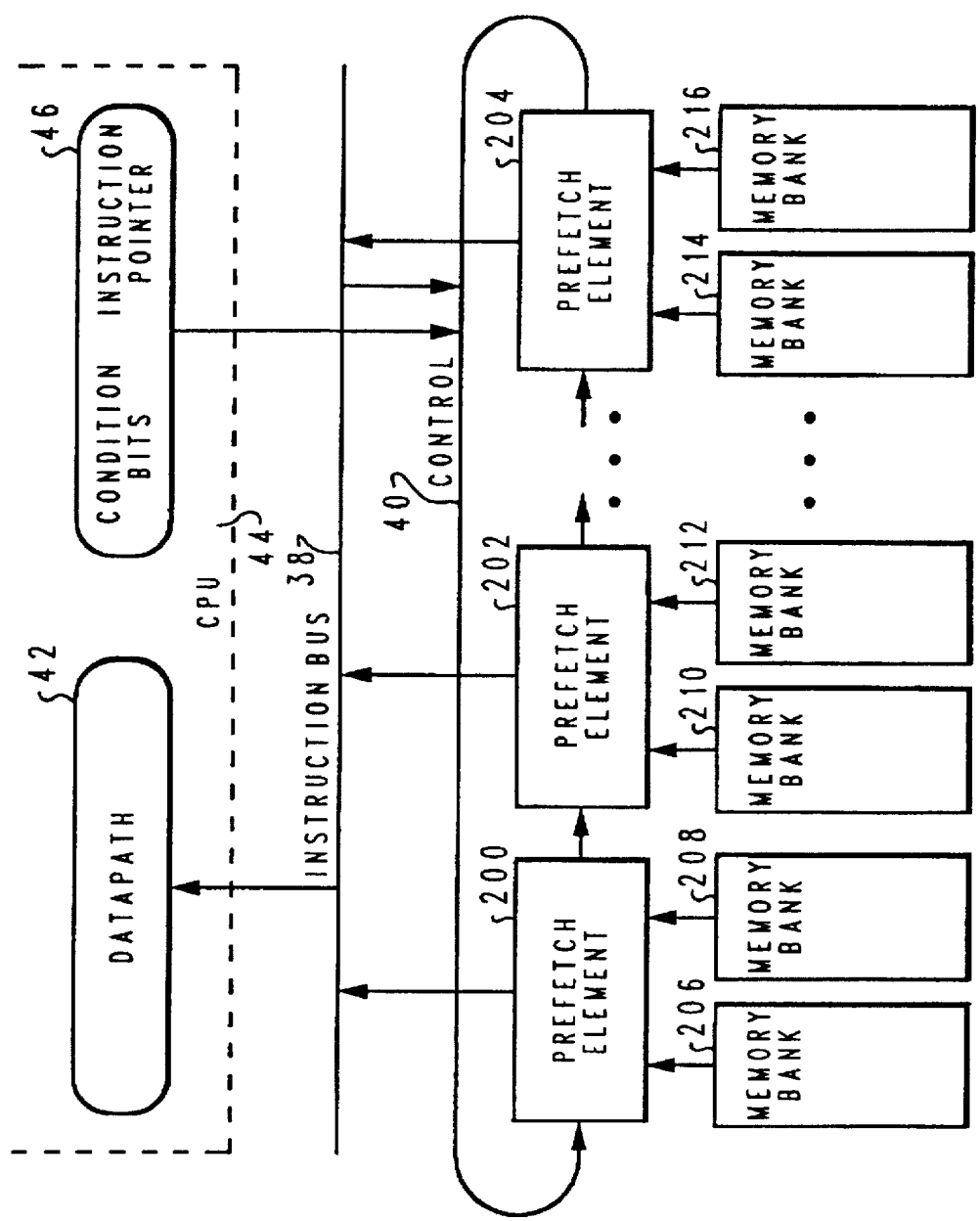
FIG. 8 depicts a high-level schematic diagram of a system for efficiently executing instructions in a central processing unit of a data processing system.

With reference now to FIG. 8, there is depicted a high-level schematic diagram of a system for efficiently executing instructions in a central processing unit of a data processing system. As illustrated, data path 42 within CPU 44 is coupled to, and receives instructions from, instruction bus 38. Control information 46, which may be generated within CPU 44, is coupled to control bus 40. Control information 46 may include condition codes, which may comprise bits that are "set" or "cleared" as a result of operations or tests performed in the registers of CPU 44, and instruction pointer data, which may indicate the memory address of the next instruction to be received by data path 42 within CPU 44.

Also coupled to instruction bus 38 and control bus 40 are M prefetch elements 200–204. Prefetch elements 200–204 are utilized to place instructions on instruction bus 38 in response to receiving an activate token via control bus 40 or instruction bus 38. Such an activate token is either passed from one prefetch element to a next prefetch element during a non-branch mode of instruction execution, or, in a branch mode of instruction execution, is generated within a prefetch element that was previously designated as a possible target of a branch instruction. After that designated prefetch element determines that it is the target of the branch instruction, and that the next software instructions following the branch are stored in memory banks associated with that prefetch element, an activate token is generated within that prefetch element.

According to an important feature of the present invention, a plurality of memory banks are coupled to each prefetch element 200–204. In this example, memory banks 206 and 208 are coupled to prefetch element 200, memory banks 210 and 212 are coupled to prefetch element 202, and memory banks 214 and 216 are coupled to prefetch element 204. Although in this example only two memory banks are coupled to each prefetch element, in other embodiments of the present invention more than two memory banks may be coupled to any one prefetch element.

By associating two or more memory banks with each prefetch element, a single prefetch element may provide two or more sequential instructions to data path 42. In order to obtain the full benefit of associating more than one memory bank with each prefetch element, the location of branch instructions, which may be stored in the memory banks associated with a prefetch element, should be restricted to the last memory bank associated with a particular prefetch element. Thus, in the example illustrated in FIG. 8, the location of branch instructions may be restricted to memory banks 208, 212, and 216. This restriction placed on the location of branch instructions prevents the execution of a sequence of consecutive branch instructions, and reduces the maximum rate of branching to one branch every other cycle time. For example, after branching to prefetch element 200, one non-branch instruction stored in memory bank 206 must be executed before executing another instruction, which may be a branch instruction, stored in memory bank 208. If the execution of a non-branch instruction is not needed between two branch instructions, then the compiler may insert a "no-op," or no-operation instruction.

By restricting branch instruction execution to every nth cycle time, the number of prefetch elements required may be significantly reduced. For example, in a data processing system which permits three-way branching and requires four cycle times before providing an instruction to instruction bus 38, 12 prefetch elements are required. If a branch operation is limited to one branch in every two cycle times, the number of prefetch elements required may be reduced to six. This reduction in the number of prefetch elements required is a result of prefetch elements becoming available to prefetch instructions during the non-branch operation executed between two branch instructions. Additional prefetch elements may also become available as a result of prefetch operations which may be abandoned because selected prefetch elements were fetching instructions a branch in the program that was not selected by a previous branch instruction. If a program should require two consecutive branch operations, a "no-op", or no-operation instruction may be inserted between the two branch instructions.

In some cases, a data processing system having a reduced number of prefetch elements may be able to sustain two or three consecutive branch operations, while not being able to sustain a continuous sequence of branch operations. The hardware savings produced by reducing the number of prefetch elements is directly proportional to the number of memory banks associated with each prefetch element, and the number of non-branch instructions executed between two branch instructions which limits the frequency of branch operations. If memory banks 206–216 are relatively slow devices, the maximum number of instructions provided by a prefetch element 200–204 is limited to the number of memory banks associated with each prefetch element. Thus, in the example of FIG. 8, prefetch elements 200–204 may provide a maximum of two sequential instructions to instruction bus 38 before another prefetch element becomes active.

Figure 9:
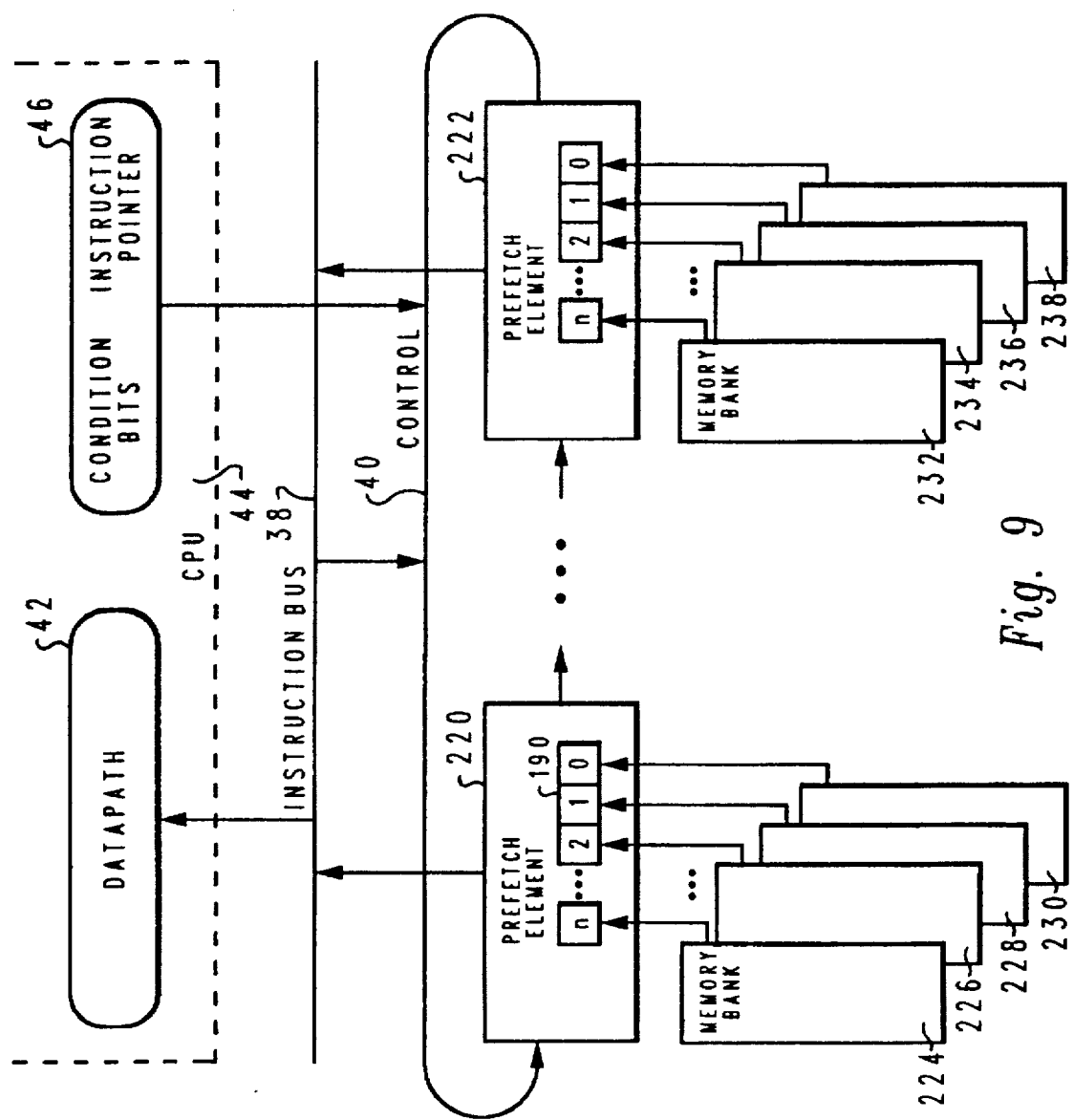
FIG. 9 illustrates a high-level schematic diagram of a method and system for efficiently fetching instructions from a memory bank comprised of "video memories"

With reference now to FIG. 9; there is depicted a high-level schematic diagram of a method and system for fetching instructions from a memory bank comprised of video memories, or video DRAMs. In this alternative embodiment, M prefetch elements 220–222 are coupled to instruction bus 38 and control bus 40 for providing instructions to data path 42 within CPU 44. Each prefetch element 220–222 receives instructions from a plurality of memory banks, each of which outputs a single bit of an n-bit instruction word. As illustrated, prefetch element 220 is coupled to the serial output of n-memory banks 224–230, and prefetch element 222 is coupled to the serial output of n-memory banks 232–238.

Memory banks 224–230 and 232–238 may be implemented utilizing any one of several known multi-port dynamic random access memories (DRAMs), also called video DRAMs, which include a random access memory array coupled to an on-chip shift register having a high-speed serial output port. Each video DRAM has one port for random access and another port for providing fast serial output from the on-chip shift register. The random access port conforms to the signal and timing requirements of a standard DRAM, and the on-chip shift register supports high-speed serial output. Additionally, the clock rate of the random access portion may be much slower, and independent from, the clock rate of the serial output portion.

In order to recall an instruction, each prefetch element provides the same address to the n-memory banks associated with that prefetch element. Thereafter, a single bit, output from the serial output port of each of the n-memory banks, is received by the prefetch element to form a single n-bit instruction word. For example, prefetch element 220 provides address signals to memory banks 224–230. Thereafter, the serial output of the shift registers within memory banks 224–230 each provide a single bit which comprises an n-bit instruction word. Moreover, since the address provided by prefetch element 220 may load an entire word comprising several bits of information into the shift registers of memory banks 224–230, several n-bit instructions may be sequentially loaded into register 240 within prefetch element 220 and transferred to instruction bus 38 at the rate of one instruction per cycle time. This is a result of the fact that instructions may be shifted out of memory banks 224–230 at several times the speed at which memory words are addressed and loaded into the shift register within memory banks 224–230.

For example, if the shift register within memory banks 224–230 are 256 bits wide, then 256 consecutive instructions may be shifted out of the memory banks and loaded into register 240 and placed on instruction bus 38 at the rate of one instruction per cycle time. The fact that several instructions may be shifted out of memory banks 224–230 at the rate of one instruction per cycle time allows other prefetch elements to prepare for a forthcoming multiway branch, thus reducing the number of prefetch elements required. For example, assume that C-cycles are required to fetch an instruction from memory. After C+1 cycles have been provided to instruction bus 38 by a particular prefetch element, all other prefetch elements within the data processing system may be idle and available to begin prefetching instructions. If the data processing system supports B-way conditional branching, a data processing system having B+1 prefetch elements may support a B-way conditional branch every C-cycles without causing CPU 44 to wait for an instruction following a B-way branch.

Figure 10:
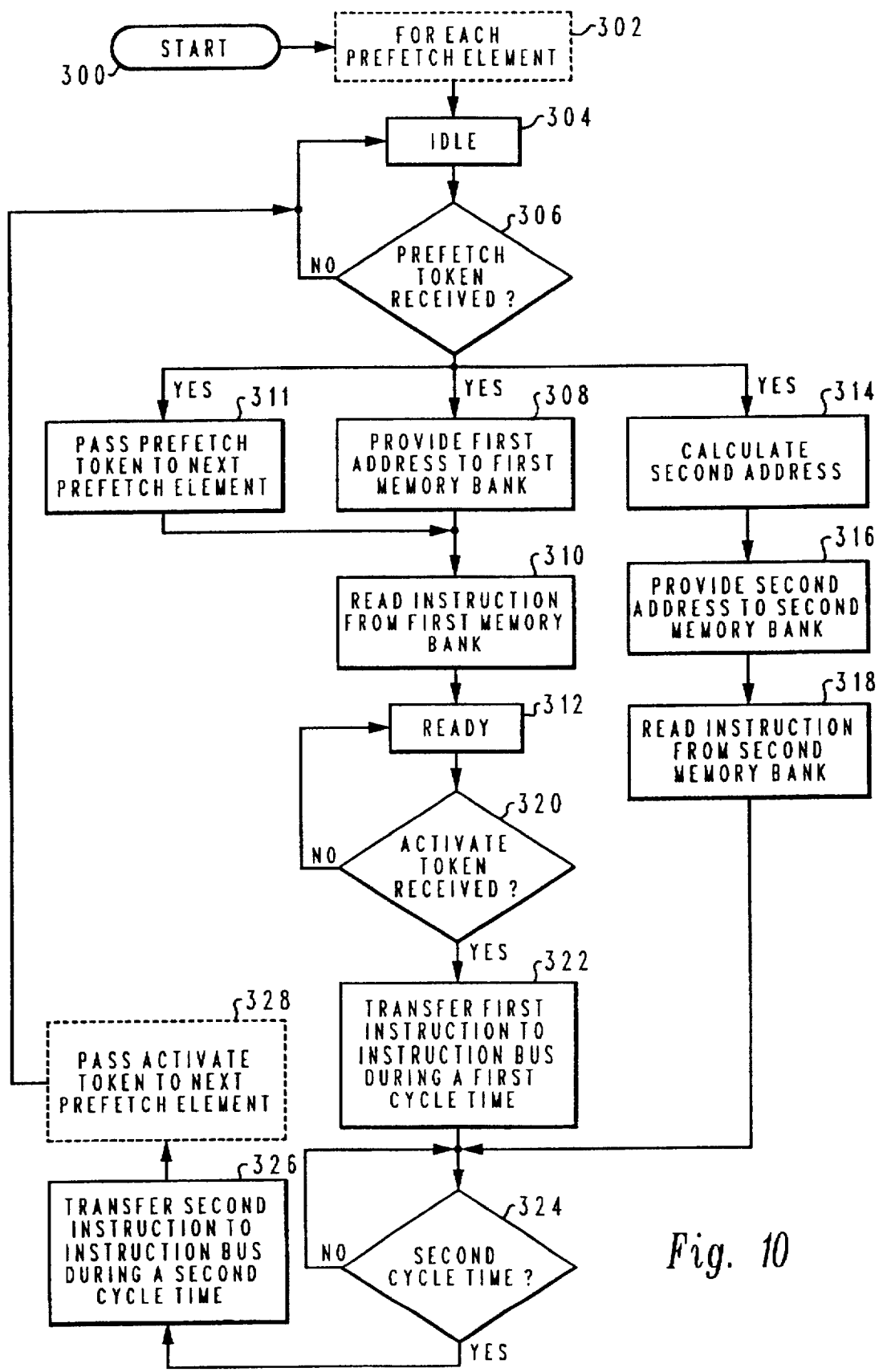
FIG. 10 is a high-level logic flowchart which illustrates the process utilized by a prefetch element to fetch instructions from a plurality of associated memory banks in accordance with the method and system of the present invention.

With reference now to FIG. 10, there is depicted a high-level logic flowchart which illustrates the process utilized by a prefetch element to fetch instructions from a plurality of associated memory banks. The process begins at block 300. Block 302 illustrates the fact that this process is conducted within each prefetch element. Initially, the prefetch element enters into an idle state, as depicted at block 304. The prefetch unit remains idle until a prefetch token has been received, as illustrated at block 306 and the "no" branch from block 306 to block 304. A prefetch element may receive a prefetch token under one of two different circumstances. In a first circumstance, a prefetch token may be received from a preceding prefetch element in the ring of prefetch elements. Receiving a prefetch token from a preceding prefetch element is typical in a non-branching mode of operation.

In a second circumstance, where a branch instruction is forthcoming, a prefetch command is issued via control bus 40 or instruction bus 38 (see FIG. 8). Such prefetch commands are issued to all possible targets of the forthcoming branch operation. Thus, if a three-way branch is forthcoming, three prefetch commands are issued to three different prefetch elements. By issuing prefetch commands to all possible targets of a multiway branch, data path 42 (see FIG. 8) may receive the appropriate instruction following the branch instruction within the cycle time immediately after the branch instruction.

Once a prefetch token has been received, the prefetch element provides a first address to the first associated memory bank, as depicted at block 308. Thereafter, the prefetch element reads an instruction from the first memory bank, as illustrated at block 310. Those persons skilled in the art will recognize that several cycle times may elapse between the time an address is provided (see block 308) and the time an instruction is read from the memory bank (see block 310).

As the prefetch element provides a first address to the first associated memory bank, the prefetch element also passes an appropriate prefetch token, containing an appropriate prefetch address, to the next prefetch element in the ring of prefetch elements during the next cycle time, as illustrated at block 311. If the last prefetch element is passing the prefetch token to the first prefetch element in the ring of prefetch elements, the prefetch address information contained in the prefetch token may be incremented. If a branch instruction is forthcoming, additional prefetch tokens may be created as the prefetch token is passed.

Once the prefetch element has read the instruction from the first memory bank, the prefetch element is ready to place that instruction on instruction bus 38, as depicted at block 312.

Referring again to block 306, once a prefetch token has been received, the prefetch element may begin to calculate the address of the second instruction stored in the second memory bank, if the address of the second instruction is different from the address of the first instruction, as illustrated at block 314. Thereafter, the prefetch element provides the second address to the second memory bank, as depicted at block 316. After what may be several cycle times later, the prefetch element reads an instruction from the second memory bank, as illustrated at block 318.

As illustrated at block 320, after the prefetch element is ready, the prefetch element determines whether or not an activate token has been received. If an activate token has not been received, the process iteratively passes to block 320 until such time as an activate token has been received.

If the prefetch element has received an activate token, the prefetch element transfers the first instruction to the instruction bus during a first cycle time, as illustrated at block 322. Thereafter, the process determines whether or not a second cycle time has begun, as depicted at block 324. If a second cycle time has not begun, the process iterates until such time as a second cycle time has begun, as illustrated by the "no" branch from block 324.

If a second cycle time has begun, the prefetch element transfers a second instruction to the instruction bus during a second cycle time, as illustrated at block 326. Such a second instruction is read from the second memory bank prior to the second cycle time, as illustrated in block 318.

After the second instruction has been transferred to the instruction bus during a second cycle time, the process may pass an activate token to the next prefetch element during the next cycle time, as depicted at block 328. If the next cycle time follows a branch instruction, the active prefetch element will be determined by the group of prefetch elements previously designated as possible targets of the branch, from information present on control bus 40. Finally, the process passes to block 304, wherein the prefetch element returns to an idle state, and becomes available to receive another prefetch token.

Figure 11:
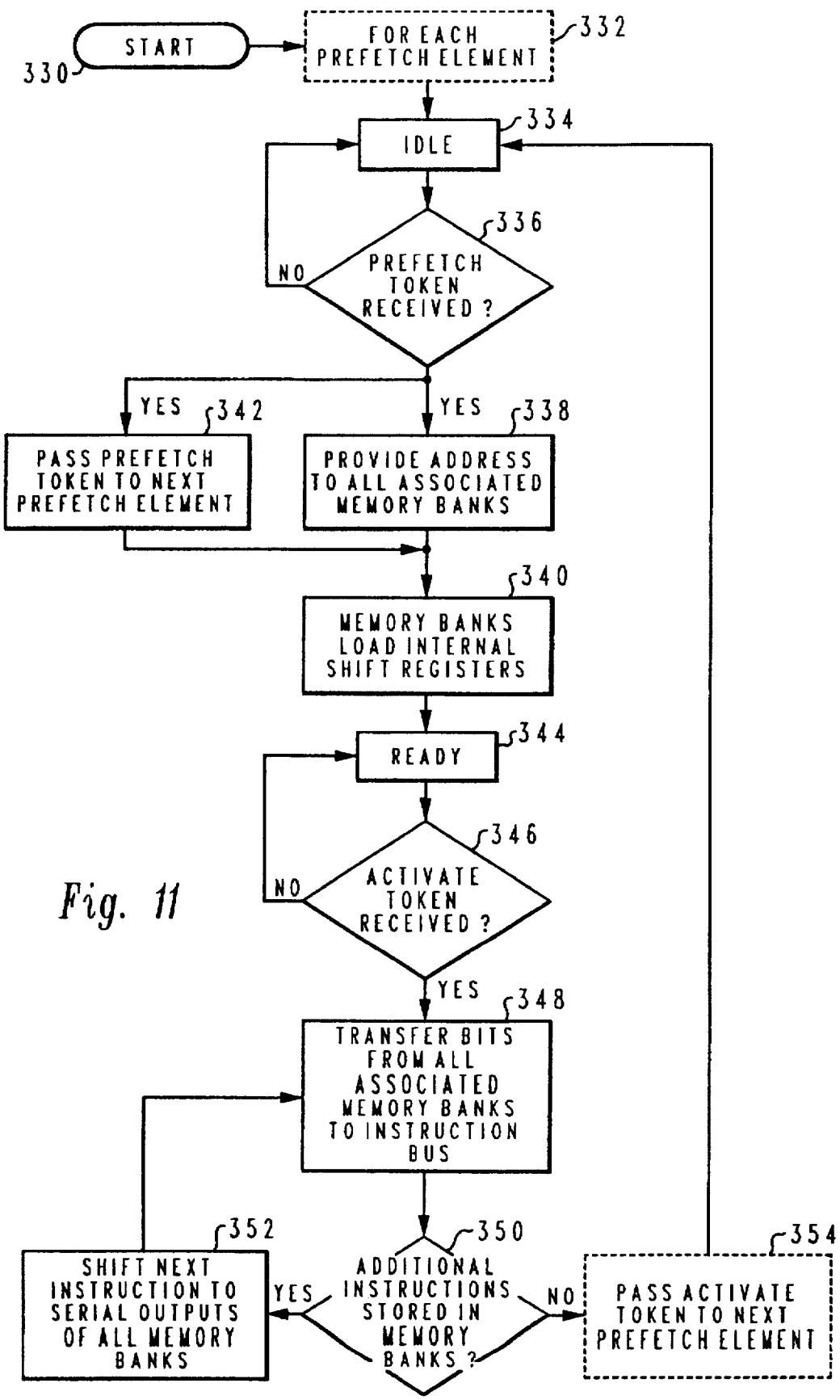
FIG. 11 is a high-level logic flowchart which illustrates the process utilized by each prefetch element to fetch a sequence of instructions from a plurality of memory banks having serial outputs in accordance with the method and system of the present invention.

Referring now to FIG. 11, there is depicted a high-level logic flowchart which illustrates the process utilized by each prefetch element to fetch a sequence of instructions from a plurality of memory banks having serial outputs. The process begins at block 330, and is conducted within each prefetch element, as illustrated at block 332. Initially, the prefetch element is placed in an idle state, as depicted at block 334. As illustrated at block 336, the prefetch element determines whether or not a prefetch token has been received. If a prefetch token has not been received, the prefetch element remains in the idle state, as depicted by the "no" branch from block 336.

If the prefetch element has received a prefetch token, the prefetch element provides an address to all memory banks associated with the prefetch element, as depicted at block 338. As mentioned above, a prefetched token may be received from a prior prefetch element in the ring of prefetch elements, or as a result of a prefetch command issued to all possible targets of a forthcoming branch operation. Once the prefetch element provides an address to all associated memory banks, the memory banks load their respective internal shift registers with the instruction word stored at the location addressed, as illustrated at block 340. Those persons skilled in the art should recognize that several cycle times may be required between the time the associated memory banks receive an address (see block 338) and the time the internal shift registers have been loaded with the addressed instruction word (see block 340).

As the prefetch element provides the address to all associated memory banks, the prefetch element also passes an appropriate prefetch token, containing an appropriate prefetch address, to the next prefetch element in the ring of prefetch elements during the next cycle time, as illustrated at block 342. If the last prefetch element is passing the prefetch token to the first prefetch element in the ring of prefetch elements, the prefetch address information contained in the prefetch token may be incremented. If a branch instruction is forthcoming, additional prefetch tokens may be created as the prefetch token is passed.

After the memory banks have loaded the internal shift registers, the prefetch element enters a ready state, as depicted at block 344. After the prefetch element is ready, the prefetch element determines whether or not an activate token has been received, as illustrated at block 346. If an activate token has not been received, the prefetch element remains in the ready state, as indicated by the "no" branch from block 346.

If an activate token has been received, the prefetch element transfers bits read from all associated memory banks to the instruction bus, as depicted at block 348. During such a transfer, one bit from each associated memory bank is utilized to form an n-bit instruction word, as described with reference to FIG. 9. Once the prefetch element has transferred such an instruction word to the instruction bus, the prefetch element determines whether or not additional instructions to be placed on the instruction bus are stored in the memory banks.

If additional instruction words are stored in the memory banks and are scheduled for execution, the prefetch element provides a shift clock to shift the next instruction word to the serial outputs of all associated memory banks, as depicted at block 352. Thereafter, the next instruction word is transferred to the instruction bus during the next consecutive cycle time.

Since the serial output clock may be capable of shifting data bits to the serial output at a clock rate of one clock per cycle time, the prefetch element is able to provide a sequence of instructions to instruction bus 38 (see FIG. 9). This sequence of instructions may comprise a number of instruction words equal to the number of bits loaded into the internal shift registers of the associated memory banks. Thus, the sequence of instruction words may be 256 instructions in length if a typical video DRAM is utilized to implement memory banks 224–230 and 232–238 (see FIG. 9).

If there are no additional instructions scheduled for execution stored in the associated memory banks, the prefetch element may pass an activate token to the next prefetch element during the next cycle time, as depicted at block 354. If the next cycle time follows a branch instruction, the active prefetch element will be determined by the group of prefetch elements previously designated as possible targets of the branch, from information present on control bus 40. Finally, the prefetch element returns to the idle state, as illustrated at block 334.

If the internal shift register of memory banks 224–230 contain a large number of bits (i.e., 256 or 512 bits), it may be advantageous to utilize a video DRAM design having an address input tap capable of tapping the shift register at different locations. For example, if a video DRAM has a 256 bit shift register, the tap feature may permit bit output to begin with bit 16, or bit 32, for example. Since instruction sequences are typically three to five instructions in length, such a tap feature permits more efficient utilization of the video DRAM storage capacity.

Another memory technology available for implementing memory banks 224–230 is the "nibble-mode" DRAM memories. While such nibble-mode DRAMs require a considerable time to respond to a memory fetch, such memories are capable of fetching words stored in several consecutive locations at a rate which may be one word per cycle time. If nibble-mode DRAMs are utilized to implement memory banks associated with a prefetch element, consecutive instruction words may be stored in consecutive memory locations. Thus, when a prefetch element becomes active, a sequence of instruction words may be provided to data path 42 at the rate of one instruction word per cycle time. After the sequence of instruction words has been transferred to instruction bus 38, the activate token may pass to the next prefetch element, where an additional sequence of instructions may be provided.

Figure 1:
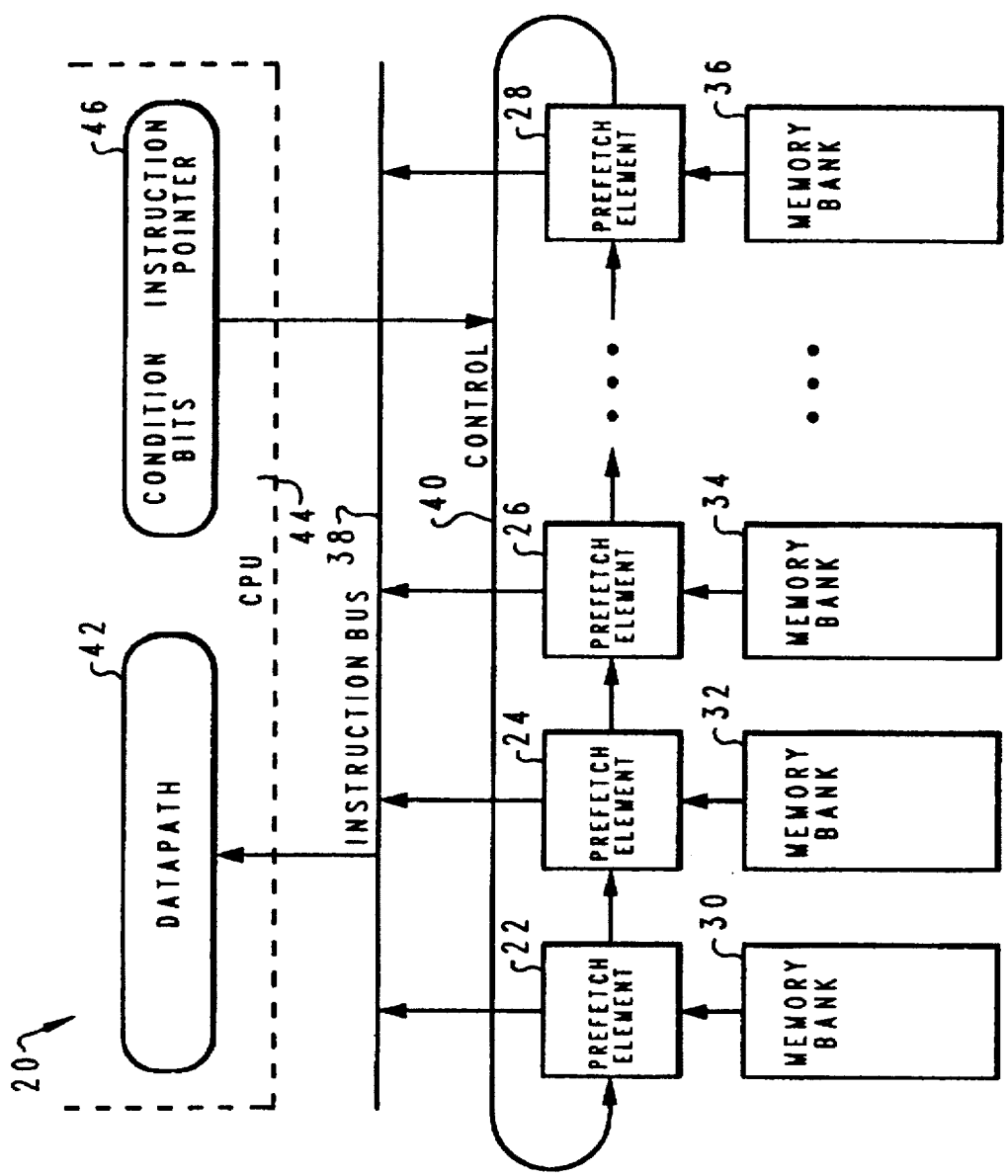
FIG. 1 depicts a ring of prefetch elements (ROPE) architecture, which is known in the prior art.
Figure 2:
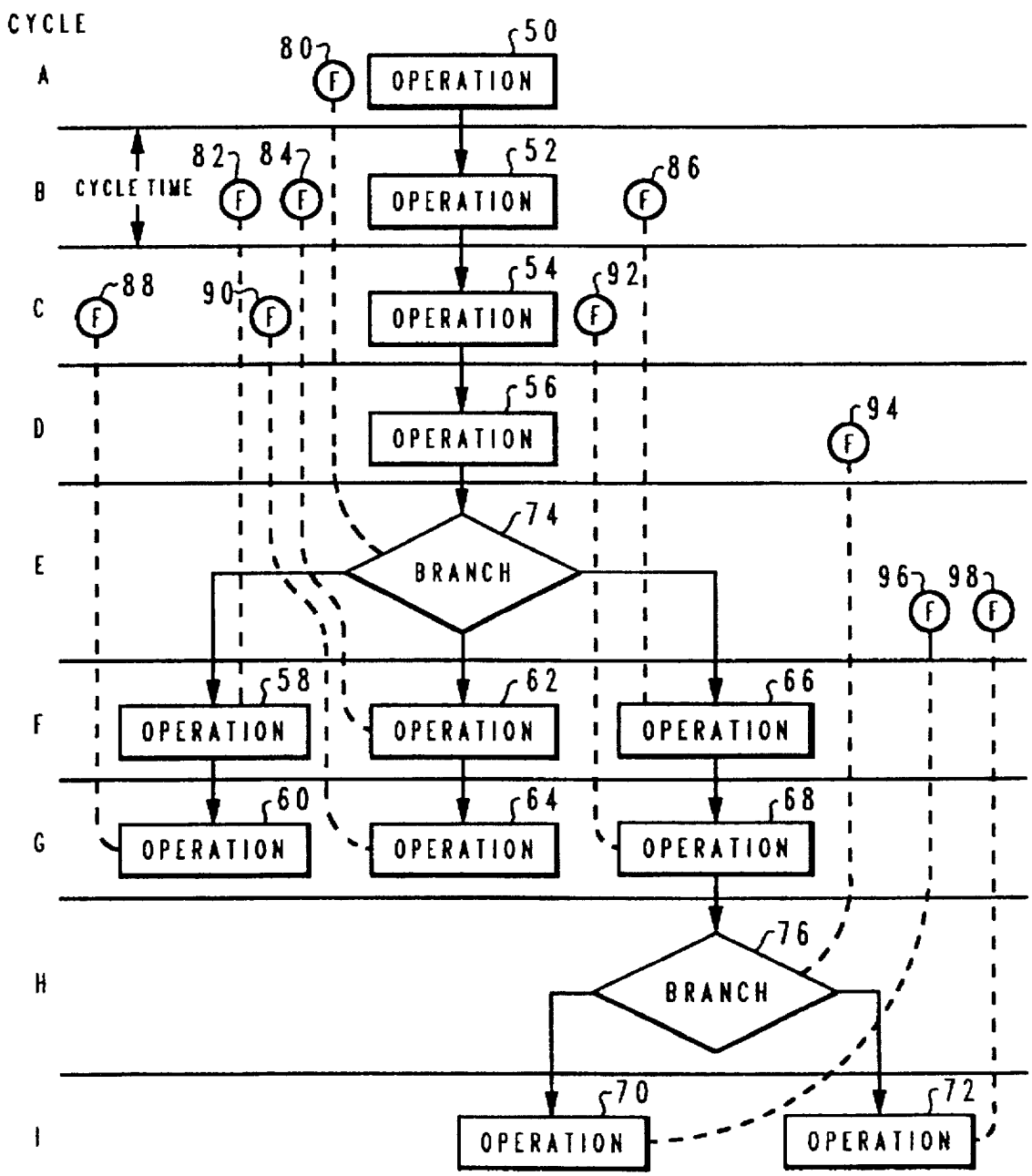
FIG. 2 depicts a prefetch schedule for performing a series of operations and branch instructions utilizing a plurality of prefetch elements as illustrated in the architecture of FIG. 1.
Figure 3:
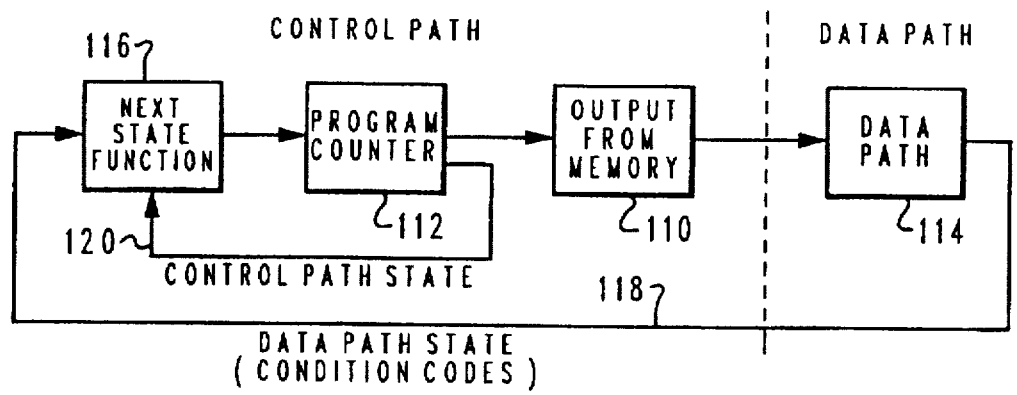
FIG. 3 illustrates a high-level state machine model of a single instruction path/single data path (SISD) data processing system, which is known in the prior art.
Figure 4:
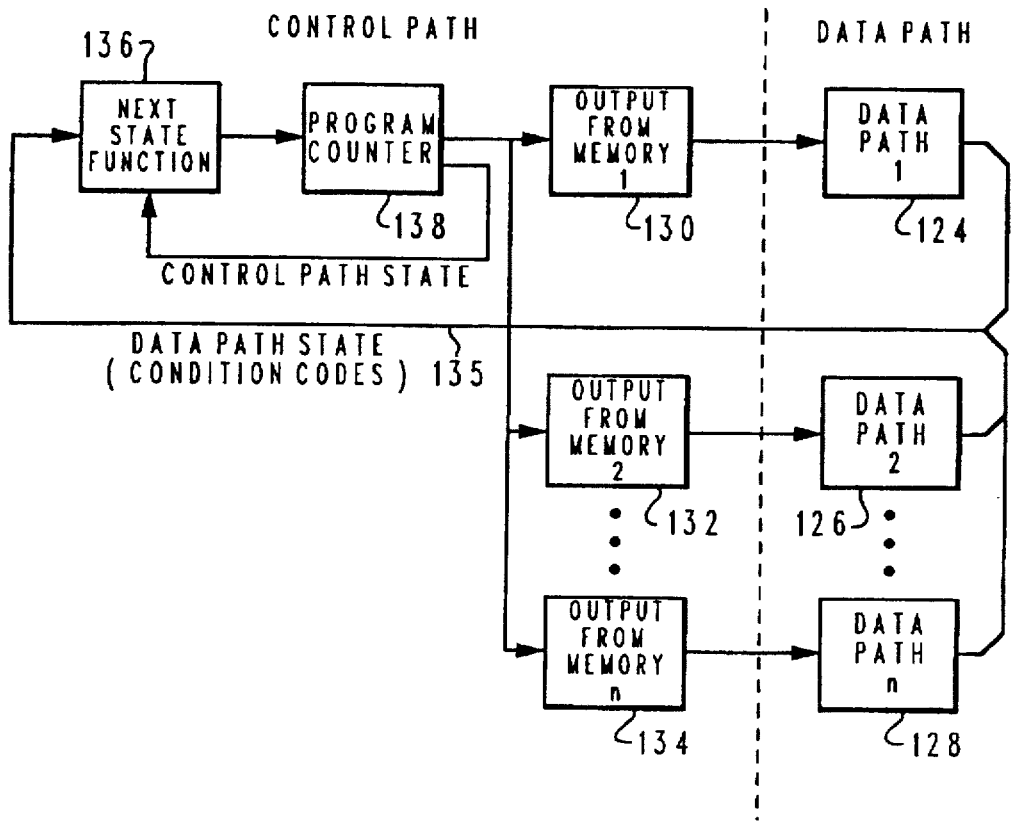
FIG. 4 depicts a high-level state machine model of a very long instruction word (VLIW) data processor, which is known in the prior art.

If nibble-mode DRAMs are utilized, the data processing system memory architecture would be similar to the architecture illustrated in FIG. 1, wherein a single memory bank is associated with each prefetch element. Even though the architecture may be similar to that illustrated in FIG. 1, the nibble-mode DRAMs provide the additional capability of fetching a plurality of instructions at a rate of one instruction per cycle time; the prior art shown in FIG. 1 does not have this capability.

Figure 12:
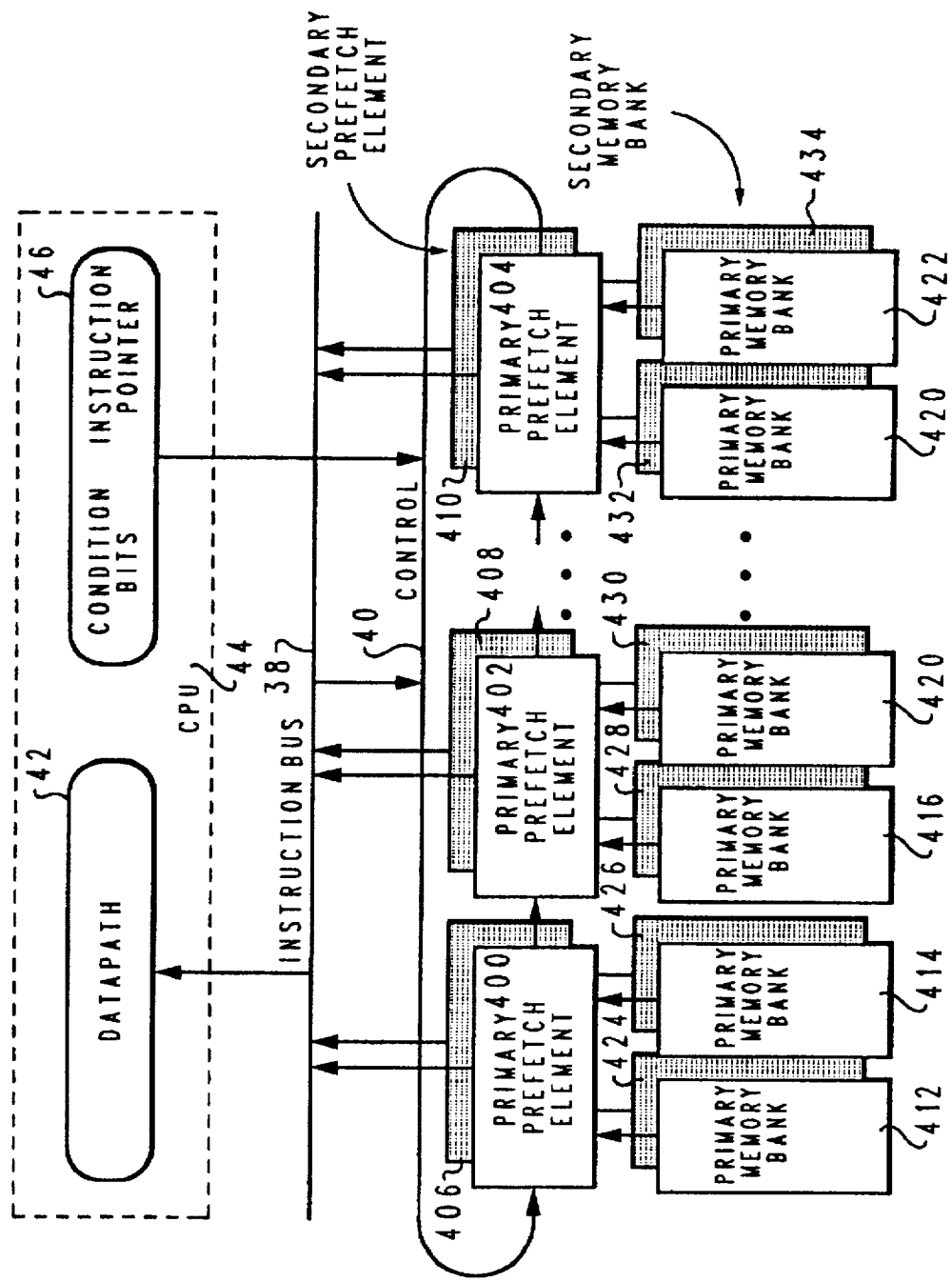
FIG. 12 depicts a high-level schematic of a system for efficiently fetching and executing variable-width instructions in a central processing unit of a data processing system in accordance with the method and system of the present invention.

With reference now to FIG. 12, there is depicted a high-level schematic of a system for efficiently fetching and executing variable-width instructions in a central processing unit of a data processing system in accordance with the method and system of the present invention. As illustrated, data path 42 within CPU 44 is coupled to, and receives instructions from instruction bus 38. Control information 46, which may be generated within CPU 44, is coupled to control bus 40. Control information 46 may include condition codes, which may comprise bits that are "set" or "cleared" as a result of operations or tests performed in the register of CPU 44, and instruction pointer data, which may indicate the memory address of the next instruction to be received by data path 42 within CPU 44.

Also coupled to instruction bus 38 and control bus 48 are M primary prefetch elements 400–404 and M' secondary prefetch elements 406–410. Primary prefetch elements 400–404 are utilized to place a primary portion of an instruction word onto instruction bus 38 in response to receiving an activate token via control bus 40 or instruction bus 38. In a similar manner, secondary prefetch elements 406–410 are utilized to place a secondary portion of an instruction word onto instruction bus 38 in response to receiving an activate token via control bus 40 or instruction bus 38.

Although the data processing system architecture illustrated in FIG. 12 includes a secondary prefetch element for every primary prefetch element, the number of secondary prefetch elements may differ from the number of primary prefetch elements in a particular design. To conserve additional program memory space, a data processing system design may comprise fewer secondary prefetch elements than primary prefetch elements.

In a ring of prefetch elements, such an activate token is either passed from one prefetch element to a next prefetch element during a non-branch mode of instruction execution, or, in a branch mode of instruction execution, is generated within a prefetch element that was previously designated as a possible target of a branch instruction. According to an important aspect of the present invention, when two rings of prefetch elements (i.e., primary and secondary) are utilized, two activate tokens are also utilized; one is utilized to activate a prefetch element in the group of primary prefetch elements 400–404, and the other is utilized to activate a prefetch element in the group of secondary prefetch elements 406–410. Within the group of primary prefetch elements 400–404, one primary prefetch element will be activated during each cycle time. Within the group of secondary prefetch elements 406–410, one secondary prefetch element will be activated at a time, however, it is possible, if not probable, that there will be cycle times in which no secondary prefetch element is activated. This is because one of the secondary prefetch elements 406–410 is activated only during a cycle time in which a secondary portion of an instruction word is to be placed on instruction bus 38 to form an extended instruction word comprised of a primary and secondary portion. Examples of when extended instruction words are to be placed on instruction bus 38 are: when CPU 44 requires an extended instruction word, when a prefetch command is issued to either a primary or secondary prefetch element via instruction bus 38, or when an activate token is generated in either a primary or secondary prefetch element after a multiway instruction via instruction bus 38.

According to an important feature of the present invention, a plurality of memory banks are coupled to each primary prefetch element 400–404, and to each secondary prefetch element 406–410. In the example of FIG. 12, primary memory banks 412 and 414 are coupled to primary prefetch element 400, primary memory banks 416 and 418 are coupled to primary prefetch element 402, and primary memory banks 420 and 422 are coupled to primary prefetch element 404. Similarly, secondary memory banks 424 and 426 are coupled to secondary prefetch element 406, secondary memory banks 428 and 430 are coupled to secondary prefetch element 408, and secondary memory banks 432 and 434 are coupled to secondary prefetch element 410.

Although in the example shown in FIG. 12, only two memory banks are coupled to each primary and secondary prefetch element, in other embodiments of the present invention more than two memory banks may be coupled to any one primary or secondary prefetch element. As described with reference to FIG. 8, coupling two or more memory banks to any one prefetch element provides the benefit of reducing the number of prefetch elements required in a particular data processing system design.

In the embodiment of the present invention illustrated in FIG. 12, the ring of primary prefetch elements 400–404 operates in a manner similar to that of the ring of prefetch elements 200–204 depicted in FIG. 8. The ring of secondary prefetch elements 406–410 depicted in FIG. 12 operates in a manner similar to that of the primary ring of prefetch elements 400–404. However, in the example illustrated in FIG. 12, the ring of secondary prefetch elements 406–410 is synchronized to operate in conjunction with the ring of primary prefetch elements 400–404 to provide a secondary portion of an instruction word to instruction bus 38 at cycle times predetermined by a software post processor after a software application has been compiled. Thus, the ring of primary prefetch elements 400–404 will provide a primary portion of an instruction word to instruction bus 38 during every cycle time, and the ring of secondary prefetch elements 406–410 will provide a secondary portion of an instruction word only during predetermined cycle times as required by the software program. When the secondary ring of prefetch elements places a secondary portion of an instruction word onto instruction bus 38, the primary and secondary portions of the instruction word are concatenated to form an extended instruction word.

Figure 13:
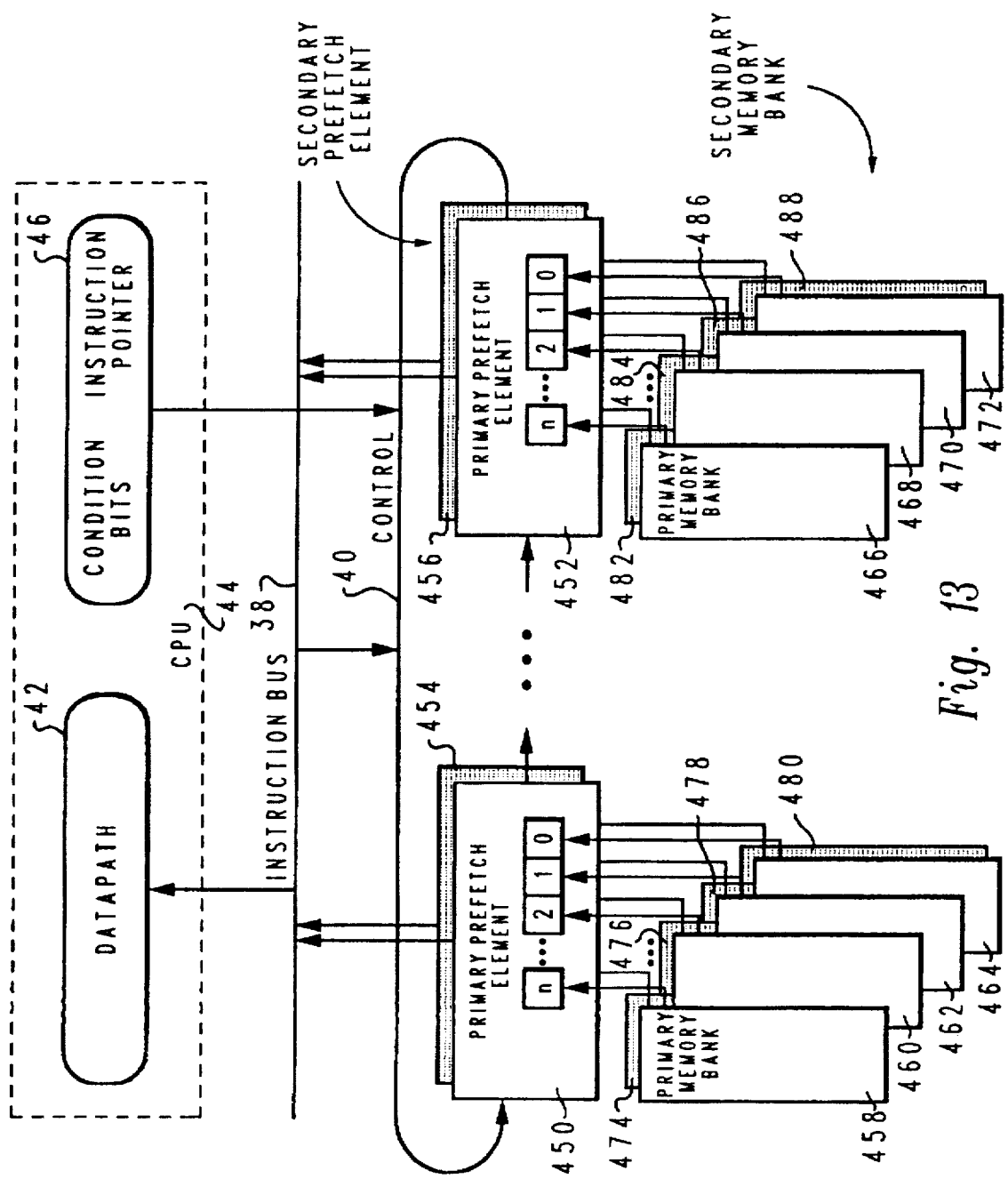
FIG. 13 illustrates a high-level schematic of a system for efficiently fetching and executing variable-width instructions that are stored in memory banks comprised of "video memories" in accordance with the method and system for the present invention.

With reference now to FIG. 13, there is depicted a high-level schematic of a system for efficiently fetching and executing variable-width instructions that are stored in memory banks comprised of "video memories" in accordance with the method and system of the present invention. In this embodiment, M primary prefetch elements 450–452 are coupled to instruction bus 38 and control bus 40. Similarly, M' secondary prefetch elements 454–456 are also coupled to instruction bus 38 and control bus 40. Both primary and secondary prefetch elements provide instructions to data path 42 within CPU 44.

Each primary and secondary prefetch element 450–452 and 454–456, respectively, receive instructions from a plurality of memory banks, each of which outputs a single bit of an n-bit instruction word. As illustrated, primary prefetch element 450 is coupled to the serial output of n-primary memory banks 458–464, and primary prefetch element 452 is coupled to the serial output of n-primary memory banks 466–472. Similarly, secondary prefetch element 454 is coupled to the serial output of n'-secondary memory banks 474–480, and secondary prefetch element 456 is coupled to the serial output of n'-secondary memory banks 482–488.

Primary and secondary memory banks 458–488 may be implemented utilizing any one of several known multi-port dynamic random access memories (DRAMs), also called "video-DRAMs," which include a random access memory array coupled to an on-chip shift register having a high-speed serial output port. Each video DRAM has one port for random access and another port for providing fast serial output from the on-chip shift register. The random access port conforms to the signal and timing requirements of a standard DRAM, and the on-chip shift register supports high-speed serial output. Additionally, the clock rate of the random access portion may be much slower, and independent from, the clock rate of the serial output portion.

In the embodiment of the present invention illustrated in FIG. 13, the ring of primary prefetch elements 450–452 operates in a manner similar to that of the ring of prefetch elements 220–222 depicted in FIG. 9. The ring of secondary prefetch elements 454–456 depicted in FIG. 13 operates in a manner similar to that of the primary ring of prefetch elements 450–452. However, in the example illustrated in FIG. 13, the ring of secondary prefetch elements 454–456 is synchronized to operate in conjunction with the ring of primary prefetch elements 450–452 to provide a secondary portion of an instruction word to instruction bus 38 at cycle times predetermined by a software post processor after a software application has been compiled. Thus, the ring of primary prefetch elements 450–452 will provide a primary portion of an instruction word to instruction bus 38 during every cycle time, and the ring of secondary prefetch elements 454–456 will provide a secondary portion of an instruction word only during predetermined cycle times as required by the software program. When the secondary ring of prefetch elements places a secondary portion of an instruction word onto instruction bus 38, the primary and secondary portions of the instruction word are concatenated to form an extended instruction word.

Although a secondary prefetch element is depicted accompanying each primary prefetch element in FIG. 13, the number of secondary prefetch elements need not be the same as the number of primary prefetch elements. By utilizing fewer secondary prefetch elements than primary prefetch elements, program memory may be conserved. Additionally, secondary prefetch elements may have a greater or lesser number of secondary memory banks coupled to them. This means that the secondary portion of an extended instruction word may be comprised of greater or fewer bits than the number of bits comprising the primary portion of an extended instruction word. Furthermore, the size of each secondary memory bank 474-488 may be smaller than the size of primary memory banks 458-472, thereby providing further conservation of program memory space.

Figure 14:
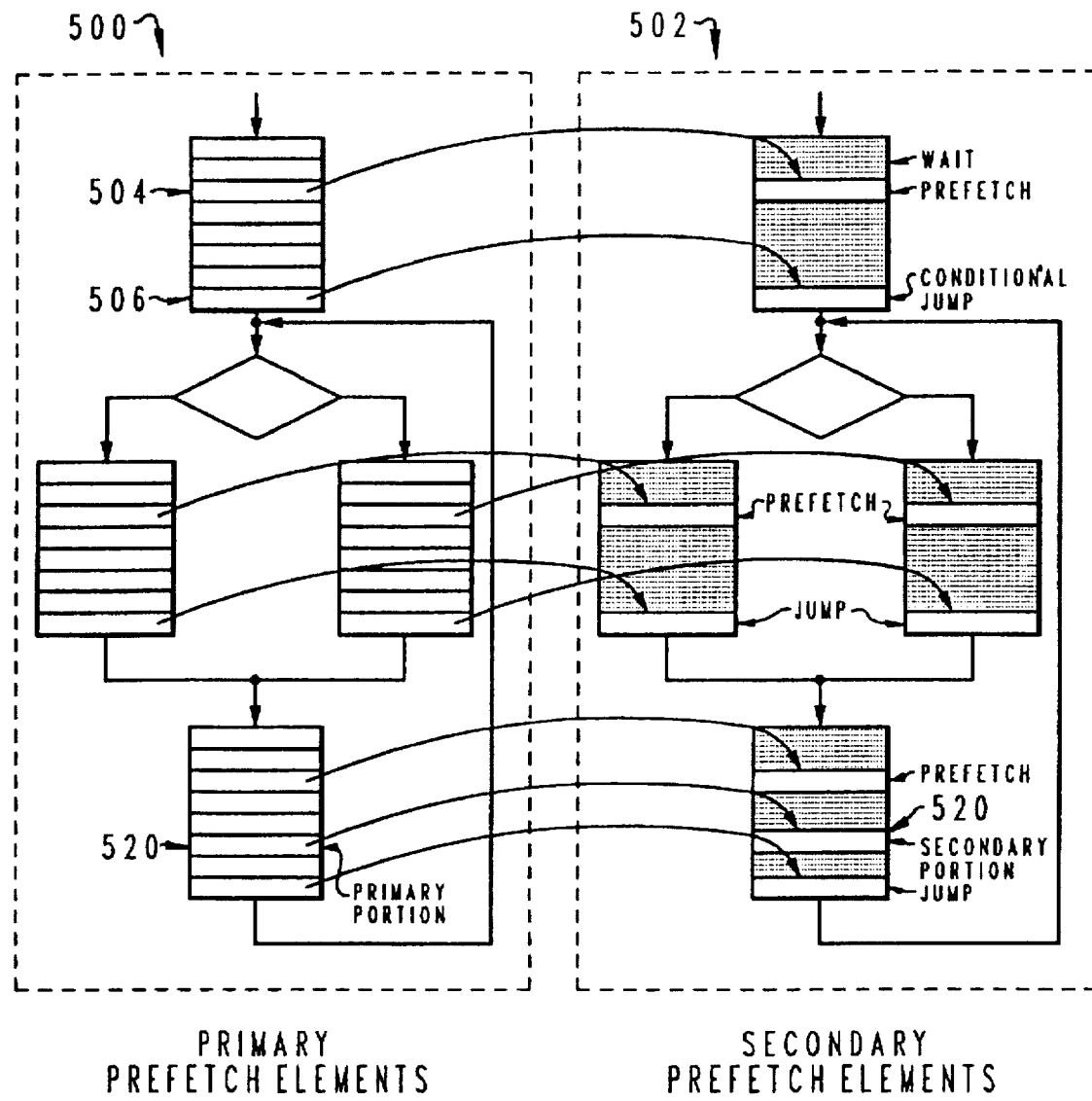
FIG. 14 depicts two high-level logic flowcharts which illustrates the synchronization of primary and secondary prefetch elements in accordance with the method and system of the present invention.

With reference now to FIG. 14, there is depicted two high-level logic flowcharts which illustrate the synchronization of primary and secondary prefetch elements in accordance with the method and system of the present invention. As illustrated, flowcharts 500 and 502 represent a flow of instructions which may be fetched and executed within CPU 44 during a portion of a software program. Flowchart 500 represents the flow of instructions fetched and provided to instruction bus 38 by a ring of primary prefetch elements, such as the ring of primary prefetch elements depicted in FIGS. 12 and 13. Flowchart 500 illustrates that one instruction per cycle time is provided to instruction bus 38 by the ring of primary prefetch elements.

Flowchart 502 illustrates the number, timing, and sequence of instructions fetched and provided to instruction bus 38 by a ring of secondary prefetch elements, such as the ring of secondary prefetch elements depicted in FIGS. 12 and 13.

Because, in the program memory architecture of the present invention, the primary portion of an instruction word is stored in primary memory banks coupled to a primary ring of prefetch elements, and a secondary portion of an instruction word is stored in secondary memory banks coupled to a secondary prefetch element, and because there are typically fewer instances when a secondary portion of an instruction word is fetched to form an extended instruction word, such a secondary ring of prefetch elements must be carefully synchronized with the primary ring of prefetch elements to provide the secondary portion of an extended instruction word during an appropriate cycle time. Primary portions of an instruction word, such as primary portion 504 are fetched every cycle time by a ring of primary prefetch elements. Some instructions in flowchart 500 may represent multiway branch instructions, such as instruction 506. In anticipation of a multiway branch instruction, several primary prefetch elements may be issued a prefetch command so that these prefetch elements may begin to fetch instructions that may be executed after the multiway branch. In this example, prefetch commands are contained in a secondary portion of an extended instruction word. Thus, in flowchart 502, a prefetch command is placed on instruction bus 38 by a secondary prefetch element during a cycle time several cycle times before the execution of instruction 506. The prefetch command fetched by a secondary prefetch element may cause selected primary and secondary prefetch elements to begin prefetching instructions from their associated memory banks.

Figure 5:
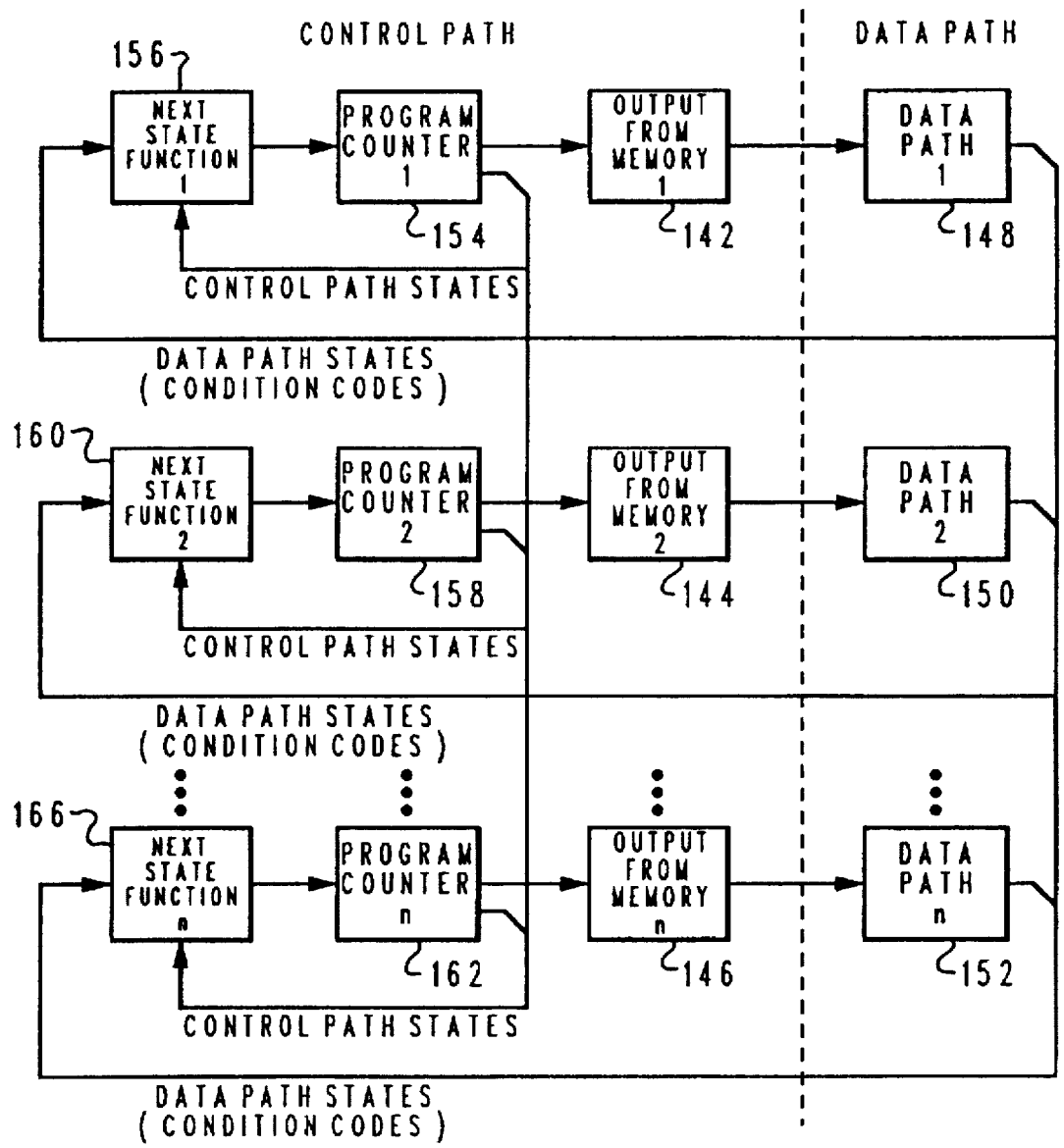
FIG. 5 illustrates a high-level state machine model of a variable instruction stream/multiple data stream (XIMD) data processor, which is known in the prior art.

As can be seen in flowchart 502, the secondary ring of prefetch elements provides a secondary portion of an instruction word to instruction bus 38 only at predetermined times that are synchronized with selected instructions in flowchart 500. Such synchronization is illustrated by the arrows between a primary portion of an instruction and in flowchart 500 and a corresponding secondary portion of an instruction word in flowchart 502. As illustrated by the state machine model of FIG. 5, the synchronization between flowcharts 500 and 502 is provided by a next state function within the secondary ring of prefetch elements. Such a next state function monitors both the program counter of the primary ring of prefetch elements and the program counter in the secondary ring of prefetch elements, and the condition codes or control information 46 from CPU 44. Thus, the program memory output of the secondary ring of prefetch elements is a function of the program counter in the primary and secondary rings of prefetch elements and the condition codes of CPU 44. In fact, the architecture of the present invention is similar to that shown in FIG. 5, except that the architecture of the present invention includes a single, variable-width data path, and only two program memory outputs, program counters, and next state functional units. In the present invention, the two program memory outputs, program counters, and next state functions, correspond to a ring of primary prefetch elements and the associated primary memory banks and a ring of secondary prefetch elements and the associated secondary memory banks, respectively.

As can be seen in FIG. 14, the ring of secondary prefetch elements spends most of the time waiting to place information on instruction bus 38. The secondary prefetch elements place information on instruction bus 38 during selected cycle times, such as, for example, to issue a prefetch command to either a primary or secondary prefetch element, to issue an activate command to either a primary or secondary prefetch element, or to provide a secondary portion of an instruction word such as secondary portion 522 is provided as a primary portion of an instruction word 520 is placed on instruction bus 38 by a primary prefetch element.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

I claim:

1. A method for efficiently executing instructions in a central processing unit of a data processing system, said method comprising the steps of:

providing M primary prefetch elements for prefetching a primary portion of an instruction word;

providing M' secondary prefetch elements for prefetching a secondary portion of an instruction word;

coupling a group of N primary memory banks to each one of said M primary prefetch elements;

coupling a group of N' secondary memory banks to each one of said M' secondary prefetch elements;

sequentially storing said primary portions of a plurality of said instruction words in each group of N primary memory banks;

sequentially storing said secondary portions of a plurality of said instruction words in each group of N' secondary memory banks;

in response to a selected primary prefetch element receiving a prefetch token, sequentially fetching said primary portions of said plurality of instruction words from said group of N primary memory banks utilizing said selected primary prefetch element;

in response to a selected secondary prefetch element receiving a prefetch token, sequentially fetching said secondary portions of said plurality of instruction words from said group of N' secondary memory banks utilizing said selected secondary prefetch element;

only in response to said selected secondary prefetch element fetching said secondary portion of said instruction word, concatenating said primary portion of said instruction word with said secondary portion of said instruction word to form an extended instruction word comprising said primary portion of said instruction word and said secondary portion of said instruction word; and sequentially executing said fetched plurality of instruction words and extended instruction words utilizing said central processing unit in said data processing system.

2. The method for efficiently executing instructions in a central processing unit of a data processing system according to claim 1 wherein, during said step of coupling a group of N' secondary memory banks to each one of said M' secondary prefetch elements, a group of N' secondary memory banks is coupled to each one of said M' secondary prefetch elements wherein each one of said group of N' secondary memory banks has a serial output coupled to said one of said M' secondary prefetch elements for serially transferring selected bits to said one of said M' secondary prefetch elements.

3. The method for efficiently executing instructions in a central processing unit of a data processing system according to claim 2 wherein, during said step of coupling a group of N' secondary memory banks to each one of said M' secondary prefetch elements wherein each one of said group of N' secondary memory banks has a serial output coupled to said one of said M' secondary prefetch elements for serially transferring selected bits to said one of said M' secondary prefetch elements, a group of N' secondary video memories is coupled to each one of said M' secondary prefetch elements for serially transferring selected bits to said one of said M' secondary prefetch elements.

4. The method for efficiently executing instructions in a central processing unit of a data processing system according to claim 1 wherein, during said step of sequentially storing said secondary portions of a plurality of said instruction words in each group of N' secondary memory banks, a plurality of N'-bit secondary portions of said instruction words are sequentially stored in each group of N' secondary memory banks wherein each bit of an N'-bit secondary portion of said instruction word is stored in a corresponding one of said N' secondary memory banks.

5. The method for efficiently executing instructions in a central processing unit of a data processing system according to claim 4 wherein, during said step of sequentially fetching said secondary portions of said plurality of instruction words from said group of N' secondary memory banks utilizing said selected secondary prefetch element, selected bits comprising said secondary portion of said plurality of N'-bit instruction words are contemporaneously and serially fetched from said group of N' secondary memory banks utilizing said selected secondary prefetch element.

6. A system for efficiently executing instructions in a central processing unit of a data processing system comprising:

a central processing unit for executing instructions, said instructions having a primary portion and a secondary portion;

a plurality of primary memory banks for storing said primary portion of said instructions;

a plurality of secondary memory banks for storing said secondary portion of said instructions;

an instruction bus coupled to said central processing unit for transferring said primary and secondary portions of said instructions to said central processing unit;

a control bus coupled to said central processing unit for transferring control data;

a plurality of primary prefetch elements, each of said plurality of primary prefetch elements coupled to a subgroup of said plurality of primary memory banks, to said instruction bus, and to said control bus, each of said plurality of primary prefetch elements for fetching said primary portion of said instructions from said subgroup of said plurality of primary memory banks and transferring said primary portion of said instructions to said instruction bus in response to receiving said control data via said control bus or said instruction bus; and a plurality of secondary prefetch elements, each of said plurality of secondary prefetch elements coupled to a subgroup of said plurality of secondary memory banks, to said instruction bus, and to said control bus, each of said plurality of secondary prefetch elements for fetching said secondary portion of said instructions from said subgroup of said plurality of secondary memory banks and transferring said secondary portion of said instructions to said instruction bus in response to receiving said control data via said control bus or said instruction bus.

7. The system for efficiently executing instructions in a central processing unit of a data processing system according to claim 6 wherein, said plurality of secondary memory banks for storing said secondary portion of said instructions comprises a plurality of secondary memory banks having a serial output, and wherein said plurality of secondary prefetch elements are each coupled to said serial output of each of a subgroup of N' of said plurality of secondary memory banks, and wherein each of said plurality of secondary memory banks is coupled to only one of said plurality of secondary prefetch elements.

8. The system for efficiently executing instructions in a central processing unit of a data processing system according to claim 7 wherein, said central processing unit may execute one instruction per cycle time, and wherein said secondary portion of said instruction word is comprised of N'-bits output from said serial output of each of said subgroup of N' of said plurality of secondary memory banks, and wherein said subgroup of N' of said plurality of secondary memory banks are coupled to a common clock for clocking an output of a series of N'-bit instruction words at a rate of up to one instruction per cycle time.

9. The system for efficiently executing instructions in a central processing unit of a data processing system according to claim 8 wherein, said plurality of secondary prefetch elements provide address signals and said common clock signal to said subgroup of N' of said plurality of secondary memory banks, and wherein the timing of said common clock signal is independent of the timing of said address signals.

10. The system for efficiently executing instructions in a central processing unit of a data processing system according to claim 9 wherein, said control data received by said plurality of secondary prefetch elements via said control bus or said instruction bus is an activate token.

11. A system for efficiently executing instructions in a central processing unit of a data processing system comprising:

a central processing unit for executing instructions, said instructions having a primary portion and a secondary portion;

a plurality of primary memory banks for storing said primary portion of said instructions;

a plurality of secondary memory banks for storing said secondary portion of said instructions;

an instruction bus coupled to said central processing unit for transferring said instructions to said central processing unit;

a control bus coupled to said central processing unit for transferring control data;

a plurality of primary prefetch elements, each of said plurality of primary prefetch elements coupled to a subgroup of said plurality of primary memory banks, to said instruction bus, and to said control bus; and a plurality of secondary prefetch elements, each of said plurality of secondary prefetch elements coupled to a subgroup of said plurality of secondary memory banks, to said instruction bus, and to said control bus;

wherein said plurality of secondary prefetch elements are each operable in a plurality of modes including:

(a) an idle mode wherein said secondary prefetch element waits for said control data before fetching said secondary portion of said instructions from said subgroup of said plurality of secondary memory banks;

(b) a fetching mode wherein said secondary prefetch element fetches said secondary portion of said instructions from said subgroup of said plurality of secondary memory banks in response to receiving said control data;

(c) a ready mode wherein said secondary prefetch element has fetched said secondary portion of said instructions from said subgroup of said plurality of secondary memory banks and is waiting to receive said control data via said control bus or said instruction bus before transferring said secondary portion of said instructions to said central processing unit via said instruction bus; and (d) an active mode wherein said secondary prefetch element transfers said secondary portion of said instructions to said central processing unit via said instruction bus in response to receiving said control data via said control bus or said instruction bus.

12. The system for efficiently executing instructions in a central processing unit of a data processing system according to claim 11 wherein, said plurality of secondary memory banks for storing said secondary portion of said instructions comprises a plurality of secondary memory banks having a serial output, and wherein said plurality of secondary prefetch elements are each coupled to said serial output of each of a subgroup of N' of said plurality of secondary memory banks, and wherein each of said plurality of secondary memory banks is coupled to only one of said plurality of secondary prefetch elements.

13. The system for efficiently executing instructions in a central processing unit of a data processing system according to claim 12 wherein, said central processing unit may execute one instruction per cycle time, and wherein said secondary portion of said instructions is comprised of N'-bits output from said serial output of each of said subgroup of N' of said plurality of secondary memory banks, and wherein said subgroup of N' of said plurality of secondary memory banks are coupled to a common clock for clocking an output of a series of N'-bit instruction words at a rate of at least one instruction per cycle time.

14. The system for efficiently executing instructions in a central processing unit of a data processing system according to claim 13 wherein, said plurality of secondary prefetch elements provide address signals and said common clock signal to said subgroup of N' of said plurality of secondary memory banks, and wherein the timing of said common clock signal is independent of the timing of said address signals.

15. The system for efficiently executing instructions in a central processing unit of a data processing system according to claim 11 wherein, said plurality of secondary prefetch elements are each coupled to a subgroup of N' secondary memory banks, and wherein each of said plurality of secondary memory banks is coupled to only one of said plurality of secondary prefetch elements.

16. The system for efficiently executing instructions in a central processing unit of a data processing system according to claim 11 wherein, said control data received by said plurality of prefetch elements via said control bus or said instruction bus is an activate token.

* * * * *

UNITED STATES PATENT AND TRADEMARK OFFICE
CERTIFICATE OF CORRECTION

PATENT NO. : 5,634,025
DATED : May 27, 1997
INVENTOR(S) : Breternitz, Jr.

It is certified that error appears in the above-indentified patent and that said Letters Patent is hereby corrected as shown below:

Column 1, line 66: change "48" to --46--

Signed and Sealed this

Nineteenth Day of August, 1997

Attest:

BRUCE LEHMAN

Attesting Officer

Commissioner of Patents and Trademarks